(12) United States Patent
Sato et al.

(10) Patent No.: US 12,099,225 B2
(45) Date of Patent: Sep. 24, 2024

(54) OPTICAL ELEMENT, IMAGE DISPLAY APPARATUS, HEAD-MOUNTED DISPLAY, SENSING APPARATUS, AND EYE TRACKING APPARATUS

(71) Applicant: FUJIFILM Corporation, Tokyo (JP)

(72) Inventors: Hiroshi Sato, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/497,248

(22) Filed: Oct. 30, 2023

(65) Prior Publication Data

US 2024/0103211 A1 Mar. 28, 2024

Related U.S. Application Data

(63) Continuation of application No. PCT/JP2022/020205, filed on May 13, 2022.

(30) Foreign Application Priority Data

May 14, 2021 (JP) ................................. 2021-082776

(51) Int. Cl.
*G02B 5/30* (2006.01)
*G02B 27/00* (2006.01)
*G02B 27/01* (2006.01)

(52) U.S. Cl.
CPC ....... *G02B 5/3016* (2013.01); *G02B 27/0093* (2013.01); *G02B 27/0172* (2013.01)

(58) Field of Classification Search
CPC ............. G02F 2413/01; G02F 2413/00; G02F 2413/06; G02F 1/133634; G02F 2413/11;
(Continued)

(56) References Cited

U.S. PATENT DOCUMENTS 6,549,254 B1 * 4/2003 Grupp .................. G02B 5/3083
349/115
2018/0164480 A1 6/2018 Yoshida
(Continued)

FOREIGN PATENT DOCUMENTS

JP 2001-91944 A 4/2001
JP 2020-194058 A 12/2020
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/ JP2022/020205, dated Nov. 23, 2023, with an English translation.
(Continued)

*Primary Examiner* — Mariam Qureshi
(74) *Attorney, Agent, or Firm* — Birch, Stewart, Kolasch & Birch, LLP

(57) ABSTRACT

The present invention provides an optical element in which the occurrence of sidelobe is suppressed and a reflectivity is high, an image display apparatus, a head-mounted display, a sensing apparatus, and an eye tracking apparatus. The optical element according to the present invention includes: at least one reflecting layer pair that is a combination of two reflective layers where turning directions of circularly polarized light to be reflected are opposite to each other and at least a part of reflection wavelength ranges is an overlapping part, in which the reflective layer includes a cholesteric liquid crystal layer obtained by immobilizing a cholesteric liquid crystalline phase, the cholesteric liquid crystal layer has a liquid crystal alignment pattern in which a direction of an optical axis derived from a liquid crystal compound changes while continuously rotating in at least one in-plane direction, and in a case where a depth position corresponding to 10% of a total helical pitch number of the reflective layer from one surface to another surface side of the reflective layer is set as a depth position X, a depth position corresponding to 90% of the total helical pitch number of the reflective layer from the one surface to the other surface side of the reflective layer is set as a depth position Y, a region from the one surface to the depth position X is set as a first region, a region from the depth position X to the depth position Y is set as a second region, and a region from the depth position Y to the other surface is set as a third region, at least one of birefringences in the first region and the third region is less than a birefringence in the second region.

19 Claims, 5 Drawing Sheets

(58) Field of Classification Search
CPC .......... G02F 1/133536; G02F 1/13718; G02B 5/3083; G02B 27/0101; G02B 27/017; G02B 2027/0118; G02B 2027/012; G02B 2027/0121; G02B 2027/015; G02B 27/0093; G02B 5/3016
See application file for complete search history.

(56) References Cited

U.S. PATENT DOCUMENTS

| | | | |
|---|---|---|---|
| 2018/0239177 A1* | 8/2018 | Oh | G02F 1/13306 |
| 2019/0109161 A1 | 4/2019 | Goto et al. | |
| 2021/0033764 A1 | 2/2021 | Sato et al. | |
| 2021/0231985 A1 | 7/2021 | Sato et al. | |
| 2021/0311259 A1 | 10/2021 | Sato et al. | |
| 2021/0373218 A1 | 12/2021 | Saitoh et al. | |
| 2022/0146742 A1 | 5/2022 | Mitobe et al. | |

FOREIGN PATENT DOCUMENTS

| | | |
|---|---|---|
| WO | WO 2016/194961 A1 | 12/2016 |
| WO | WO 2018/003642 A1 | 1/2018 |
| WO | WO 2019/194291 A1 | 10/2019 |
| WO | WO 2020/075711 A1 | 4/2020 |
| WO | WO 2020/122128 A1 | 6/2020 |
| WO | WO 2020/166691 A1 | 8/2020 |
| WO | WO 2021/020337 A1 | 2/2021 |
| WO | WO 2021/065532 A1 | 4/2021 |

OTHER PUBLICATIONS

International Search Report (Form PCT/ISA/210) for International Application No. PCT/JP2022/020205, dated Aug. 2, 2022, with English translation.

* cited by examiner

OPTICAL ELEMENT, IMAGE DISPLAY APPARATUS, HEAD-MOUNTED DISPLAY, SENSING APPARATUS, AND EYE TRACKING APPARATUS

CROSS-REFERENCE TO RELATED APPLICATIONS

This application is a Continuation of PCT International Application No. PCT/JP2022/020205 filed on May 13, 2022, which claims priority under 35 U.S.C. § 119(a) to Japanese Patent Application No. 2021-082776 filed on May 14, 2021. The above applications are hereby expressly incorporated by reference, in their entirety, into the present application.

BACKGROUND OF THE INVENTION

1. Field of the Invention

The present invention relates to an optical element, an image display apparatus, a head-mounted display, a sensing apparatus, and an eye tracking apparatus.

2. Description of the Related Art

A layer (hereinafter, also referred to as "cholesteric liquid crystal layer") obtained by immobilizing a cholesteric liquid crystalline phase is known as a layer that selectively reflects at least either right circularly polarized light or left circularly polarized light in a specific wavelength range. An optical element in which a reflection direction of reflected light is reflected obliquely instead of specular reflection by finely controlling an alignment state of the cholesteric liquid crystal layer (for example, WO2016/194961A).

SUMMARY OF THE INVENTION

In this optical element, reflection characteristics having higher selectivity are required. In particular, it is required to suppress the occurrence of sidelobe. The sidelobe refers to a portion S in which a reflectivity relatively increases having a wavelength in the vicinity of the outside of a reflection wavelength range B as shown in FIG. 1. When this sidelobe occurs, light having a wavelength that should not be reflected originally is reflected, which is not preferable.

Under the above-described circumstances, an object of the present invention is to provide an optical element in which the occurrence of sidelobe is suppressed and a reflectivity is high.

In addition, another object of the present invention is to provide an image display apparatus, a head-mounted display, a sensing apparatus, and an eye tracking apparatus.

The present inventors found that the object can be achieved by the following configurations.

(1) An optical element comprising:
at least one reflecting layer pair that is a combination of two reflective layers where turning directions of circularly polarized light to be reflected are opposite to each other and at least a part of reflection wavelength ranges is an overlapping part,
in which the reflective layer includes a cholesteric liquid crystal layer obtained by immobilizing a cholesteric liquid crystalline phase,
the cholesteric liquid crystal layer has a liquid crystal alignment pattern in which a direction of an optical axis derived from a liquid crystal compound changes while continuously rotating in at least one in-plane direction, and in a case where a depth position corresponding to 10% of a total helical pitch number of the reflective layer from one surface to another surface side of the reflective layer is set as a depth position X, a depth position corresponding to 90% of the total helical pitch number of the reflective layer from the one surface to the other surface side of the reflective layer is set as a depth position Y, a region from the one surface to the depth position X is set as a first region, a region from the depth position X to the depth position Y is set as a second region, and a region from the depth position Y to the other surface is set as a third region, at least one of birefringences in the first region and the third region is less than a birefringence in the second region.

(2) The optical element according to (1),
in which the reflective layer includes a plurality of the cholesteric liquid crystal layers,
rotation directions of the optical axes derived from the liquid crystal compounds in the liquid crystal alignment patterns of the plurality of cholesteric liquid crystal layers in one reflective layer among the two reflective layers are the same as each other, and
rotation directions of the optical axes derived from the liquid crystal compounds in the liquid crystal alignment patterns of the plurality of cholesteric liquid crystal layers in the other reflective layer among the two reflective layers are the same as each other.

(3) The optical element according to (1) or (2),
wherein a rotation direction of the optical axis derived from the liquid crystal compound in the liquid crystal alignment pattern of the cholesteric liquid crystal layer in one reflective layer among the two reflective layers and a rotation direction of the optical axis derived from the liquid crystal compound in the liquid crystal alignment pattern of the cholesteric liquid crystal layer in the other reflective layer among the two reflective layers are opposite to each other.

(4) The optical element according to (1) to (3),
in which in a case where, in the liquid crystal alignment pattern of the cholesteric liquid crystal layer, a length over which the direction of the optical axis derived from the liquid crystal compound rotates by 180° in the one in-plane direction in which the direction of the optical axis derived from the liquid crystal compound changes while continuously rotating is set as a single period,
a length of the single period in the liquid crystal alignment pattern of the cholesteric liquid crystal layer in one reflective layer among the two reflective layers and a length of the single period in the liquid crystal alignment pattern of the cholesteric liquid crystal layer in the other reflective layer among the two reflective layers are the same as each other.

(5) The optical element according to any one of (1) to (4),
in which at least one of the cholesteric liquid crystal layers has a region where a length of the single period in the liquid crystal alignment pattern varies in a plane.

(6) The optical element according to any one of (1) to (5),
in which at least one of the cholesteric liquid crystal layers has a region where a length of the single period in the liquid crystal alignment pattern gradually changes in the one in-plane direction.

(7) The optical element according to any one of (1) to (6),
in which the reflective layer includes a plurality of the cholesteric liquid crystal layers formed of compositions including different liquid crystal compounds, and
a birefringence of the cholesteric liquid crystal layer gradually decreases toward at least one surface side of the reflective layer from the cholesteric liquid crystal layer positioned at a center position of a film thickness in the reflective layer.

(8) The optical element according to (7),
in which in the reflective layer, a helical pitch number of the cholesteric liquid crystal layer having a lowest birefringence is less than or equal to half of a helical pitch number of the cholesteric liquid crystal layer having a highest birefringence.

(9) The optical element according to any one of (1) to (8),
in which in a cross section of the cholesteric liquid crystal layer observed with a scanning electron microscope,
a bright portion and a dark portion derived from a cholesteric liquid crystalline phase are tilted with respect to a main surface of the cholesteric liquid crystal layer, and
at least one cholesteric liquid crystal layer is further provided where, in a case where an in-plane retardation is measured from a normal direction of the main surface of the cholesteric liquid crystal layer and a direction tilted with respect to a normal line, a direction in which the in-plane retardation is minimum in any one of a slow axis plane or a fast axis plane is tilted from the normal direction.

(10) The optical element according to (9),
in which a region is provided where an average tilt angle of the dark portion gradually changes in the one in-plane direction as a length of the single period in the liquid crystal alignment pattern decreases.

(11) The optical element according to (9),
in which a region is provided where an average tilt angle of the dark portion increases as a length of the single period in the liquid crystal alignment pattern decreases.

(12) The optical element according to any one of (1) to (11), further comprising:
a retardation layer.

(13) The optical element according to (12),
in which the retardation layer is provided between the first reflective layer and the second reflective layer.

(14) The optical element according to any one of (1) to (13),
in which a plurality of the reflecting layer pairs are provided, and
selective reflection center wavelengths of the reflective layers forming the reflecting layer pair vary between the different reflecting layer pairs.

(15) The optical element according to any one of (1) to (14),
in which a plurality of the reflecting layer pairs are provided, and
a permutation of lengths of selective reflection center wavelengths and a permutation of lengths of the single periods in the cholesteric liquid crystal layers of the reflective layers forming the reflecting layer pair match each other in the different reflecting layer pairs.

(16) An image display apparatus comprising:
the optical element according to any one of (1) to (15); and
an image display panel.

(17) A head-mounted display comprising:
the image display apparatus according to (16).

(18) A sensing apparatus comprising
the optical element according to any one of (1) to (15).

(19) An eye tracking apparatus comprising
the optical element according to any one of (1) to (15).

The present invention can provide an optical element in which the occurrence of sidelobe is suppressed and a reflectivity is high.

In addition, the present invention also provides an image display apparatus, a head-mounted display, a sensing apparatus, and an eye tracking apparatus.

DESCRIPTION OF THE PREFERRED EMBODIMENTS

Hereinafter, the present invention will be specifically described.

The following constituents will be described based on typical embodiments of the present invention in some cases, but the present invention is not limited to the embodiments.

In the present specification, numerical ranges represented by "to" include numerical values before and after "to" as lower limit values and upper limit values.

In the present specification, materials that correspond to each of components may be used alone or in combination of two or more kinds. Here, in a case where two or more kinds of materials are used in combination for each of components, the content of the component refers to the total content of the materials to be combined unless specified otherwise.

In the present specification, "(meth)acrylate" represents "either or both of acrylate and methacrylate".

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In the present specification, a birefringence of a cholesteric liquid crystal layer and each of regions represents a birefringence having a wavelength of 550 nm.

In the present specification, a reflection wavelength range refers to a wavelength range of circularly polarized light that is derived from a cholesteric liquid crystal layer and is selectively reflected.

A feature point of an optical element according to an embodiment of the present invention is, for example, that a reflective layer has regions where birefringences are different in a film thickness direction and two reflective layers that reflect right circularly polarized light and left circularly polarized light, respectively, are used. The reflective layer has the regions where birefringences are different in the film thickness direction such that reflected light components interfere with each other to weaken each other. As a result, sidelobe is reduced. In addition, two reflective layers that reflect right circularly polarized light and left circularly polarized light, respectively, are used such that a reflectivity increases.

Figure 1:
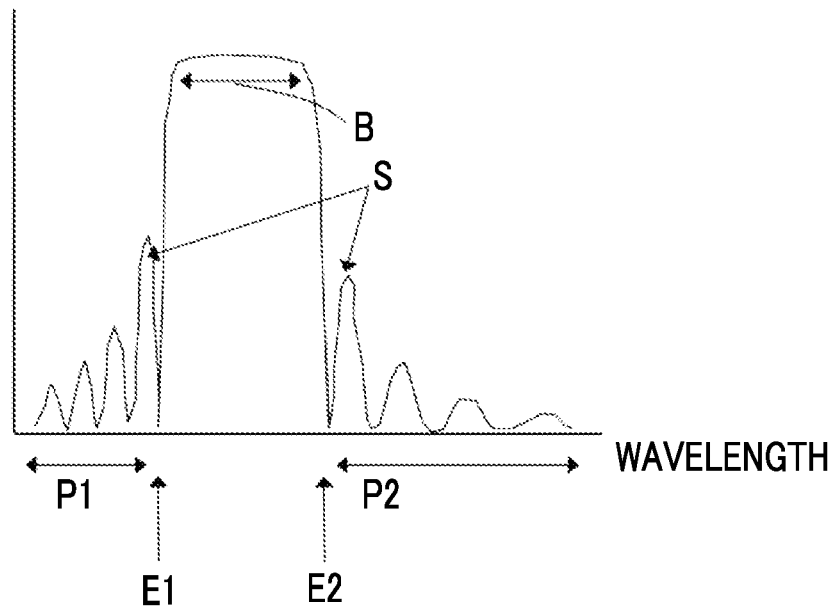
FIG. 1 is a graph showing general reflectance properties of a cholesteric liquid crystal layer.
Figure 2:
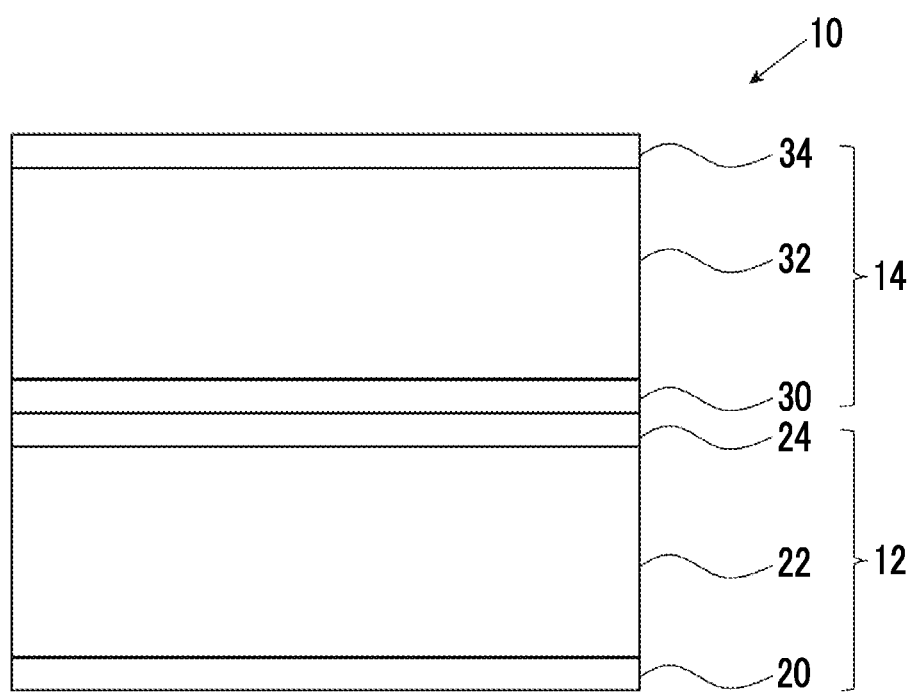
FIG. 2 is a side view showing one example of an optical element.

FIG. 2 is a side view conceptually showing an example of the optical element according to the embodiment of the present invention.

An optical element 10 includes a first reflective layer 12 and a second reflective layer 14. The first reflective layer 12 includes three cholesteric liquid crystal layers including a first cholesteric liquid crystal layer 20, a second cholesteric liquid crystal layer 22, and a third cholesteric liquid crystal layer 24. The second reflective layer 14 includes three cholesteric liquid crystal layers including a fourth cholesteric liquid crystal layer 30, a fifth cholesteric liquid crystal layer 32, and a sixth cholesteric liquid crystal layer 34.

Although described below in detail, a turning direction of circularly polarized light to be reflected by the first reflective layer 12 and a turning direction of circularly polarized light to be reflected by the second reflective layer 14 are opposite to each other. In addition, a reflection wavelength range of the first reflective layer 12 and a reflection wavelength range of the second reflective layer 14 overlap each other. That is, the first reflective layer 12 and the second reflective layer 14 configure a reflecting layer pair that is a combination of two reflective layers where turning directions of circularly polarized light to be reflected are opposite to each other and at least a part of reflection wavelength ranges is an overlapping part.

The cholesteric liquid crystal layers (the first cholesteric liquid crystal layer 20 to the sixth cholesteric liquid crystal layer 34) in the first reflective layer 12 and the second reflective layer 14 correspond to layers obtained by immobilizing a cholesteric liquid crystalline phase.

FIG. 2 shows an aspect where each of the first reflective layer 12 and the second reflective layer 14 includes three cholesteric liquid crystal layers, but the present invention is not limited to this aspect. Although a birefringence in a predetermined depth region of the reflective layer described below is satisfied, the number of cholesteric liquid crystal layers in each of the reflective layers may be one or plural.

The cholesteric liquid crystal layers in each of the first reflective layer 12 and the second reflective layer 14 can reflect light having a predetermined wavelength (for example, visible light, more specifically, blue light, green light, red light, or the like).

<Description and Reflective Layer and Cholesteric Liquid Crystal Layer>

Figure 3:
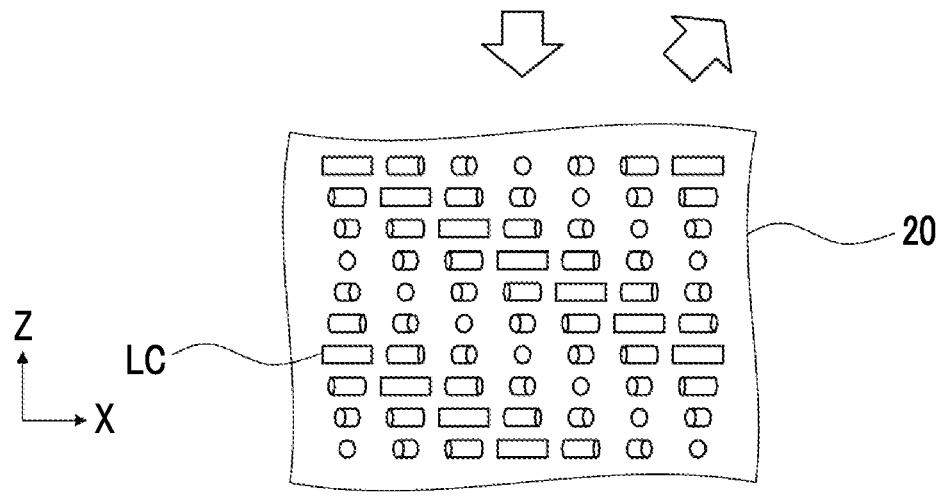
FIG. 3 is a cross-sectional view showing a first cholesteric liquid crystal layer.
Figure 4:
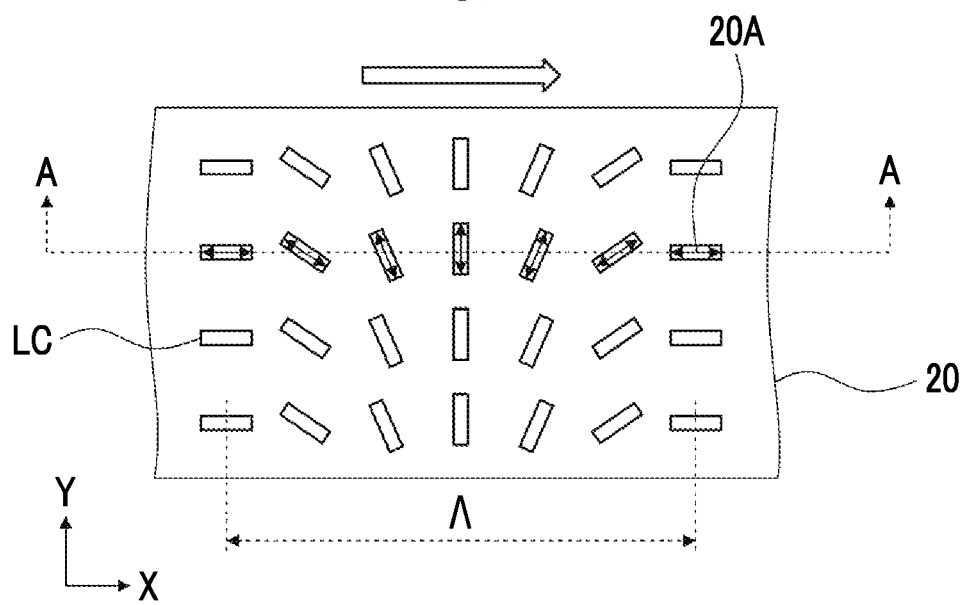
FIG. 4 is a plan view showing the first cholesteric liquid crystal layer shown in FIG. 3.

In order to describe the cholesteric liquid crystal layer, FIG. 3 shows a cross-sectional view of the first cholesteric liquid crystal layer 20. FIG. 4 shows a plan view of the first cholesteric liquid crystal layer 20 shown in FIG. 3. The plan view is a view in a case where the first cholesteric liquid crystal layer 20 is seen from the top. In addition, FIG. 3 is a cross-sectional view taken along line A-A in FIG. 4.

In FIG. 3, an X direction and a Z direction represent directions of two coordinate axes orthogonal to each other on the observation surface. The Z direction is parallel to a thickness direction of the first cholesteric liquid crystal layer 20.

In FIG. 4, the X direction and a Y direction represent directions of two coordinate axes orthogonal to each other on the observation surface.

As conceptually shown in FIG. 3, as in a typical cholesteric liquid crystal layer obtained by immobilizing a cholesteric liquid crystalline phase, the first cholesteric liquid crystal layer 20 has a helical structure where a liquid crystal compound LC is turned along a helical axis parallel to the thickness direction and laminated. As schematically shown in FIG. 3, in the helical structure, a configuration in which the liquid crystal compound LC is helically rotated once (rotated by 360) is set as one helical pitch, and plural pitches of the helically turned liquid crystal compound LC are laminated. Regarding this point, the same can be applied to the second cholesteric liquid crystal layer 22 to the sixth cholesteric liquid crystal layer 34.

Note that, as described below, in the first cholesteric liquid crystal layer 20 to the third cholesteric liquid crystal layer 24 and the fourth cholesteric liquid crystal layer 30 to the sixth cholesteric liquid crystal layer 34, rotation directions of optical axes derived from liquid crystal compounds in liquid crystal alignment patterns are opposite to each other.

The first cholesteric liquid crystal layer 20 to the sixth cholesteric liquid crystal layer 34 have wavelength-selective reflectivity.

It is known that the cholesteric liquid crystalline phase exhibits selective reflectivity at a specific wavelength. The central wavelength $\lambda$ of selective reflection (selective reflection center wavelength $\lambda$) depends on a pitch P (helical pitch) of a helical structure in the cholesteric liquid crystalline phase and satisfies a relationship of $\lambda = n \times P$ with an average refractive index n of the cholesteric liquid crystalline phase. Therefore, the selective reflection center wavelength can be adjusted by adjusting the pitch of the helical structure. The helical pitch of the cholesteric liquid crystalline phase depends on the kind of a chiral agent which is used in combination of a liquid crystal compound during the formation of the cholesteric liquid crystal layer, or the concentration of the chiral agent added. Therefore, a desired pitch can be obtained by adjusting the kind and concentration of the chiral agent. That is, the pitch P (helical pitch) of the helical structure in the cholesteric liquid crystalline phase refers to a helical period in the helical structure of the cholesteric liquid crystalline phase.

The details of the adjustment of the pitch can be found in "Fuji Film Research&Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

In the present specification, a selective reflection center wavelength (for example, a selective reflection center wavelength of a reflective layer or a selective reflection center wavelength of a cholesteric liquid crystal layer) refers to an average value of two wavelengths at which, in a case where a minimum value of a transmittance of a target object (member) is represented by Tmin (%), a half value transmittance: T½ (%) represented by the following expression is exhibited.

Expression for obtaining Half Value Transmittance:
$T\frac{1}{2} = 100 - (100 - T\min) \div 2$ The cholesteric liquid crystalline phase exhibits selective reflectivity with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, in the first cholesteric liquid crystal layer 20 shown in FIG. 3, the cholesteric liquid crystal layer is a layer obtained by immobilizing a right-twisted cholesteric liquid crystalline phase.

A turning direction of the cholesteric liquid crystalline phase can be adjusted by adjusting the kind of the liquid crystal compound that forms the cholesteric liquid crystal layer and/or the kind of the chiral agent to be added.

In addition, a half-width Δλ (nm) of a reflection wavelength range (circularly polarized light reflection range) where selective reflection is exhibited depends on a birefringence Δn of the cholesteric liquid crystal layer and the helical pitch P and satisfies a relationship of Δλ=Δn×P. Therefore, the width of the reflection wavelength range can be controlled by adjusting Δn. Δn can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the use of the optical element 10 and is, for example, preferably 10 to 500 nm, more preferably 20 to 300 nm, and still more preferably 30 to 150 nm.

In a case where the reflective layers in the optical element include a plurality of cholesteric liquid crystal layers, in each of the reflective layers, an absolute value of a difference in selective reflection center wavelength between a cholesteric liquid crystal layer having a largest reflection center wavelength and a cholesteric liquid crystal layer having a smallest selective reflection center wavelength is preferably 50 nm or less and more preferably 25 nm or less from the viewpoint of further suppressing the occurrence of sidelobe. The lower limit is not particularly limited and, for example, 0.

As shown in FIGS. 3 and 4, the first cholesteric liquid crystal layer 20 has a liquid crystal alignment pattern in which a direction of an optical axis 20A derived from the liquid crystal compound LC forming the cholesteric liquid crystalline phase changes while continuously rotating in one in-plane direction of the cholesteric liquid crystal layer. Regarding this point, the same can be applied to the second cholesteric liquid crystal layer 22 to the sixth cholesteric liquid crystal layer 34.

The optical axis 20A derived from the liquid crystal compound LC is an axis having the highest refractive index in the liquid crystal compound LC. For example, in a case where the liquid crystal compound LC is a rod-like liquid crystal compound, the optical axis 20A is along a rod-like major axis direction. In the following description, the optical axis 20A derived from the liquid crystal compound LC will also be referred to as "the optical axis 20A of the liquid crystal compound LC" or "the optical axis 20A".

As shown in FIG. 4, the liquid crystal compound LC forming the first cholesteric liquid crystal layer 20 is two-dimensionally disposed in the X direction and a direction orthogonal to a direction (Y direction) orthogonal to the X direction.

The liquid crystal compound LC forming the first cholesteric liquid crystal layer 20 has the liquid crystal alignment pattern in which the direction of the optical axis 20A changes while continuously rotating in the X direction in the in-plane direction. In the example shown in the drawing, the liquid crystal compound LC has the liquid crystal alignment pattern in which the optical axis 20A of the liquid crystal compound LC changes while continuously rotating clockwise along the white arrow.

Specifically, "the direction of the optical axis 20A of the liquid crystal compound LC changes while continuously rotating in the white arrow direction (the predetermined one in-plane direction)" represents that an angle between the optical axis 20A of the liquid crystal compound LC, which is arranged in the white arrow direction, and the white arrow direction varies depending on positions in the white arrow direction, and the angle between the optical axis 20A and the white arrow direction sequentially changes from θ to θ+180° or θ-180° in the white arrow direction.

A difference between the angles of the optical axes 20A of the liquid crystal compounds LC adjacent to each other in the white arrow direction is preferably 450 or less, more preferably 150 or less, and still more preferably less than 15°.

On the other hand, in the liquid crystal compound LC forming the first cholesteric liquid crystal layer 20, the directions of the optical axes 20A are the same in the Y direction orthogonal to the X direction, that is, the Y direction orthogonal to the one in-plane direction in which the optical axis 20A continuously rotates.

In other words, in the liquid crystal compound LC forming the first cholesteric liquid crystal layer 20, angles between the optical axes 20A of the liquid crystal compound LC and the X direction are the same in the Y direction.

In the optical element 10 according to the embodiment of the present invention, in the liquid crystal alignment pattern of the liquid crystal compound LC, the length (distance) over which the optical axis 20A of the liquid crystal compound LC rotates by 180° in the X direction in which the optical axis 20A changes while continuously rotating in a plane is the length Λ of the single period in the liquid crystal alignment pattern.

That is, a distance between centers of two liquid crystal compounds LC in the X direction is the length Λ of the single period, the two liquid crystal compounds having the same angle in the X direction. Specifically, as shown in FIG. 4, a distance of centers in the X direction of two liquid crystal compounds LC in which the X direction and the direction of the optical axis 20A match each other is defined as the length Λ of the single period.

In the following description, the length Λ of the single period will also be referred to as "single period Λ".

In the liquid crystal alignment pattern of the cholesteric liquid crystal layer, the single period Λ is repeated in the X direction, that is, in the one in-plane direction in which the direction of the optical axis 20A changes while continuously rotating.

The first cholesteric liquid crystal layer 20 has the liquid crystal alignment pattern in which the optical axis 20A changes while continuously rotating in the X direction in a plane (the predetermined one in-plane direction).

The cholesteric liquid crystal layer obtained by immobilizing a cholesteric liquid crystalline phase typically reflects incident light (circularly polarized light) by specular reflection.

On the other hand, the first cholesteric liquid crystal layer 20 having the above-described liquid crystal alignment pattern reflects incident light in a direction having an angle in the X direction with respect to specular reflection. Specifically, as shown in FIG. 3, in the first cholesteric liquid crystal layer 20, light incident from the normal direction is reflected in a state where it is tilted with respect to the normal direction instead of being reflected in the normal direction. That is, the light incident from the normal direction refers to light incident from the front side, that is, light that is vertically incident into a main surface. The main surface refers to the maximum surface of a sheet-shaped material.

A reflection angle of light from the cholesteric liquid crystal layer in which the optical axis 20A of the liquid crystal compound LC continuously rotates in the one in-plane direction (X direction) varies depending on wavelengths of light to be reflected. Specifically, as the wavelength of light increases, the angle of reflected light with respect to incidence light increases.

In addition, a reflection angle of light from the cholesteric liquid crystal layer in which the optical axis 20A of the liquid crystal compound LC continuously rotates in the one in-plane direction (X direction) varies depending on the length Λ of the single period of the liquid crystal alignment pattern over which the optical axis 20A rotates by 180° in the X direction, that is, depending on the single period Λ. Specifically, as the length of the single period Λ decreases, the angle of reflected light with respect to incidence light increases.

The single period Λ is not particularly limited and may be appropriately set depending on the use and the like of the optical element 10. For example, the single period Λ is preferably 50 μm or less and more preferably 10 μm or less. In consideration of the accuracy of the liquid crystal alignment pattern and the like, the single period Λ is preferably 0.1 μm or more.

As described above, the cholesteric liquid crystal layers (the first cholesteric liquid crystal layer 20 to the sixth cholesteric liquid crystal layer 34) in the optical element 10 have the above-described liquid crystal alignment pattern.

In particular, rotation directions of the optical axes derived from the liquid crystal compounds in the liquid crystal alignment patterns of the first cholesteric liquid crystal layer 20 to the third cholesteric liquid crystal layer 24 in the first reflective layer 12 are the same as each other.

In addition, rotation directions of the optical axes derived from the liquid crystal compounds in the liquid crystal alignment patterns of the fourth cholesteric liquid crystal layer 30 to the sixth cholesteric liquid crystal layer 34 in the second reflective layer 14 are the same as each other.

That is, in a case where each of the reflective layers forming the reflecting layer pair includes a plurality of cholesteric liquid crystal layers, it is preferable that rotation directions of the optical axes derived from the liquid crystal compounds in the liquid crystal alignment patterns of the plurality of cholesteric liquid crystal layers in each of the reflective layers are the same as each other.

In addition, as described above, a turning direction of circularly polarized light to be reflected by the first reflective layer 12 and a turning direction of circularly polarized light to be reflected by the second reflective layer 14 are opposite to each other.

Figure 5:
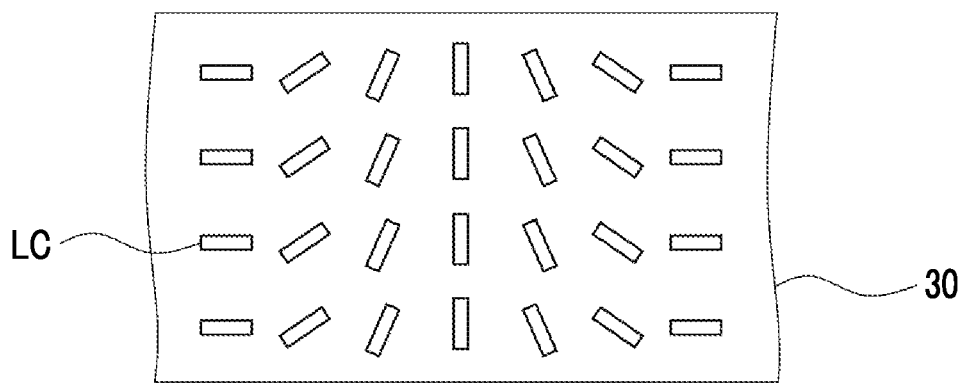
FIG. 5 is a plan view showing a fourth cholesteric liquid crystal layer.

That is, in the optical element 10, rotation directions of the optical axes derived from the liquid crystal compounds in the liquid crystal alignment patterns of the cholesteric liquid crystal layers (the first cholesteric liquid crystal layer 20 to the third cholesteric liquid crystal layer 24) in the first reflective layer 12 and rotation directions of the optical axes derived from the liquid crystal compounds in the liquid crystal alignment patterns of the cholesteric liquid crystal layers (the fourth cholesteric liquid crystal layer 30 to the sixth cholesteric liquid crystal layer 34) in the second reflective layer 14 are opposite to each other. More specifically, FIG. 5 shows a plan view of the fourth cholesteric liquid crystal layer 30 as a representative example. A rotation direction of the optical axis derived from the liquid crystal compound in the liquid crystal alignment pattern of the fourth cholesteric liquid crystal layer 30 as shown in FIG. 5 and a rotation direction of the optical axis derived from the liquid crystal compound in the liquid crystal alignment pattern of the first cholesteric liquid crystal layer 20 as shown in FIG. 4 are opposite to each other.

In the optical element 10, the reflection wavelength range of the first reflective layer 12 and the reflection wavelength range of the second reflective layer 14 overlap each other. As described above, the turning direction of circularly polarized light to be reflected by the first reflective layer 12 and the turning direction of circularly polarized light to be reflected by the second reflective layer 14 are opposite to each other. Therefore, as described above, in a case where the reflection wavelength ranges of the first reflective layer 12 and the second reflective layer 14 overlap each other, both of right circularly polarized light and left circularly polarized light having a predetermined wavelength can be reflected, and reflection characteristics are higher.

Whether or not at least a part of reflection wavelength ranges of the reflective layers is an overlapping part can be verified by measuring a wavelength distribution of reflected light.

The widths and the positions of the reflection wavelength ranges of the reflective layers (the first reflective layer and the second reflective layer) can be controlled by adjusting the reflection characteristics of the cholesteric liquid crystal layers in each of the reflective layers (the first reflective layer and the second reflective layer).

The present invention is not limited to an aspect where the reflection wavelength range of the first reflective layer and the reflection wavelength range of the second reflective layer completely overlap each other, and only at least a part of the reflection wavelength ranges of the two reflective layers (the first reflective layer and the second reflective layer) forming the reflecting layer pair needs to be an overlapping part.

From the viewpoint of the amount of reflected light of the optical element, it is preferable that the overlapping region of the reflection wavelength ranges of the two reflective layers (the first reflective layer and the second reflective layer) forming the reflecting layer pair is wide. Specifically, a difference between the selective reflection center wavelengths of the two reflective layers (the first reflective layer and the second reflective layer) forming the reflecting layer pair is preferably 50 nm or less and more preferably 25 nm or less. In particular, it is still more preferable that the selective reflection center wavelengths of the two reflective layers (the first reflective layer and the second reflective layer) forming the reflecting layer pair match each other.

In addition, the lengths of the single periods Λ in the liquid crystal alignment patterns of the first cholesteric liquid crystal layer 20 to the third cholesteric liquid crystal layer 24 in the first reflective layer 12 are the same as each other.

In addition, the lengths of the single periods Λ in the liquid crystal alignment patterns of the fourth cholesteric liquid crystal layer 30 to the sixth cholesteric liquid crystal layer 34 in the second reflective layer 14 are the same as each other.

In a case where each of the reflective layers forming the reflecting layer pair includes a plurality of cholesteric liquid crystal layers, it is preferable that the lengths of the single periods Λ in the liquid crystal alignment patterns of the plurality of cholesteric liquid crystal layers in each of the reflective layer are the same as each other.

In addition, the lengths of the single periods Λ in the liquid crystal alignment patterns of the cholesteric liquid crystal layers (the first cholesteric liquid crystal layer 20 to the third cholesteric liquid crystal layer 24) of the first reflective layer 12 and the lengths of the single periods Λ in the liquid crystal alignment patterns of the cholesteric liquid crystal layers (the fourth cholesteric liquid crystal layer 30 to the sixth cholesteric liquid crystal layer 34) of the second reflective layer 14 are the same.

It is preferable that the length of the single period Λ in the liquid crystal alignment pattern of the cholesteric liquid crystal layer in one reflective layer forming the reflecting layer pair and the length of the single period Λ in the liquid crystal alignment pattern of the cholesteric liquid crystal layer in the other reflective layer among the two reflective layers are the same.

In the present invention, the lengths of the single periods Λ in the liquid crystal alignment patterns being the same represents that the difference between the lengths of the single periods Λ is 30% or less. As a method of calculating the difference, in a case where two single periods Λ to be compared to each other are set as a single period Λx and a single period Λy and the single period Λx is more than the single period Λy, the difference is calculated from the expression {(the single period Λx−the single period Λy)/(the single period Λx)×100. In addition, in a case where the single period Λx and the single period Λy are the same value, the difference is 0%.

As described above, in the cholesteric liquid crystal layers of each of the reflective layers, it is preferable that the difference between the lengths of the single periods Λ in the liquid crystal alignment patterns is small. As described above, the length of the single period Λ decreases, the reflection angle with respect to incidence light increases. Accordingly, as the difference between the lengths of the single periods Λ decreases, reflection directions of light from the cholesteric liquid crystal layers that reflect light having the same turning direction can be approximated to each other.

All the directions in which the optical axes derived from the liquid crystal compounds in the liquid crystal alignment patterns of the cholesteric liquid crystal layers (the first cholesteric liquid crystal layer 20 to the third cholesteric liquid crystal layer 24) in the first reflective layer 12 continuously change are the same. In this aspect, the reflection directions of light from the cholesteric liquid crystal layers in the first reflective layer 12 can be matched to each other.

In addition, all the directions in which the optical axes derived from the liquid crystal compounds in the liquid crystal alignment patterns of the cholesteric liquid crystal layers (the fourth cholesteric liquid crystal layer 30 to the sixth cholesteric liquid crystal layer 34) in the second reflective layer 14 continuously change are the same. In this aspect, the reflection directions of light from the cholesteric liquid crystal layers in the second reflective layer 14 can be matched to each other.

That is, in a case where each of the reflective layers forming the reflecting layer pair includes a plurality of cholesteric liquid crystal layers, it is preferable that all the directions in which the optical axes of the liquid crystal compounds in the liquid crystal alignment patterns of the plurality of cholesteric liquid crystal layers of each of the reflective layers continuously change are the same as each other.

In the present invention, the directions in which the optical axes of the liquid crystal compounds in the liquid crystal alignment patterns of the two cholesteric liquid crystal layers continuously change being the same represents that an angle between the directions in which the optical axes of the liquid crystal compounds in the liquid crystal alignment patterns of the two cholesteric liquid crystal layers continuously change is preferably less than 10°, more preferably less than 10, and still more preferably less than 0.5°.

The present invention is not limited to this aspect, and the directions in which the optical axes of the liquid crystal compounds in the liquid crystal alignment patterns of the two cholesteric liquid crystal layers in the first reflective layer continuously change may be different from each other. For example, the angle between the directions in which the optical axes of the liquid crystal compounds in the liquid crystal alignment patterns of the two cholesteric liquid crystal layers in the first reflective layer continuously change may be 20°.

In addition, the directions in which the optical axes of the liquid crystal compounds in the liquid crystal alignment patterns of the two cholesteric liquid crystal layers in the second reflective layer continuously change may be different from each other.

In the first reflective layer 12, a birefringence of the second cholesteric liquid crystal layer 22 is more than birefringences of the first cholesteric liquid crystal layer 20 and the third cholesteric liquid crystal layer 24. The first cholesteric liquid crystal layer 20 and the third cholesteric liquid crystal layer 24 have the same birefringence.

In addition, in the second reflective layer 14, a birefringence of the fifth cholesteric liquid crystal layer 32 is more than birefringences of the fourth cholesteric liquid crystal layer 30 and the sixth cholesteric liquid crystal layer 34. The fourth cholesteric liquid crystal layer 30 and the sixth cholesteric liquid crystal layer 34 have the same birefringence.

The optical element according to the embodiment of the present invention is not particularly limited to this aspect, and the configuration thereof is not particularly limited as long as a requirement X described below is satisfied.

Examples of a method of adjusting the birefringence of each of the cholesteric liquid crystal layers include a method of adjusting a birefringence of the liquid crystal compound used for forming each of the cholesteric liquid crystal layers. Examples of the liquid crystal compound used for forming the second cholesteric liquid crystal layer 22 include a method of selecting a liquid crystal compound having a larger birefringence than the liquid crystal compounds used for forming the first cholesteric liquid crystal layer 20 and the third cholesteric liquid crystal layer 24.

That is, it is preferable that the reflective layer includes a plurality of cholesteric liquid crystal layers formed of compositions including different liquid crystal compounds.

In the optical element according to the embodiment of the present invention, it is preferable that, as in the first reflective layer 12 and the second reflective layer 14 in the optical element 10, a birefringence of the cholesteric liquid crystal layer gradually decreases toward at least one surface side of the reflective layer from the cholesteric liquid crystal layer (corresponding to the second cholesteric liquid crystal layer 22 and the fifth cholesteric liquid crystal layer 32) positioned at a center position of a film thickness in the reflective layer. By adopting the above-described aspect, the occurrence of sidelobe can be further suppressed.

The thicknesses of the cholesteric liquid crystal layers in each of the reflective layers in the optical element are not particularly limited, and the configuration thereof is not particularly limited as long as the requirement X described below is satisfied. As shown in FIG. 2, it is preferable that, among the cholesteric liquid crystal layers in the reflective layer, the film thickness of the cholesteric liquid crystal layer (the second cholesteric liquid crystal layer 22 and the fifth cholesteric liquid crystal layer 32) positioned at the center position of the film thickness in the reflective layer is the largest.

In addition, in the optical element according to the embodiment of the present invention, it is preferable that, in the reflective layer, a helical pitch number of the cholesteric liquid crystal layer having a lowest birefringence is less than or equal to half of a helical pitch number of the cholesteric liquid crystal layer having a highest birefringence. By adopting the above-described aspect, the occurrence of sidelobe can be further suppressed. In particular, the helical pitch number of the cholesteric liquid crystal layer having the lowest birefringence is preferably 1/2.5 or less and preferably 1/10 or more of the helical pitch number of the cholesteric liquid crystal layer having the highest birefringence.

In particular, from the viewpoint of increasing reflectivity, the helical pitch number of the cholesteric liquid crystal layer having the highest birefringence is preferably 6 or more, more preferably 8 or more, and still more preferably 10 or more.

In addition, from the viewpoint of further suppressing the occurrence of sidelobe, the helical pitch number of the cholesteric liquid crystal layer having the lowest birefringence is preferably 5.0 or less and more preferably 3.0 or less. The lower limit is not particularly limited and may be 1.0 or more.

(Description of Requirement X)

Both of the first reflective layer 12 and the second reflective layer 14 in the optical element 10 satisfy the requirement X described below.

Requirement X: in a case where a depth position corresponding to 10% of a total helical pitch number of the reflective layer from one surface to another surface side of the reflective layer is set as a depth position X, a depth position corresponding to 90% of the total helical pitch number of the reflective layer from the one surface to the other surface side of the reflective layer is set as a depth position Y, a region from the one surface to the depth position X is set as a first region, a region from the depth position X to the depth position Y is set as a second region, and a region from the depth position Y to the other surface is set as a third region, at least one of birefringences in the first region and the third region is less than a birefringence in the second region.

Hereinafter, the requirement X will be described with respect to FIG. 6 using the first reflective layer 12 as a representative example.

Figure 6:
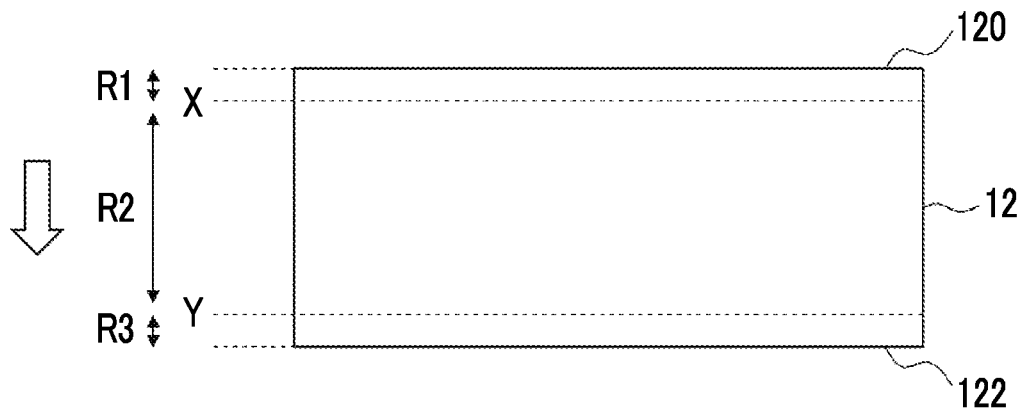
FIG. 6 is a cross-sectional view showing a first reflective layer to describe a requirement X.

FIG. 6 is a cross-sectional view showing only the first reflective layer 12 in the optical element 10.

First, as indicated by the white arrow in FIG. 6, a depth position corresponding to 10% of a total helical pitch number of the first reflective layer 12 from one surface 120 to another surface 122 side of the first reflective layer 12 is represented by a depth position X. That is, a depth position corresponding to 10% of a total helical pitch number of the first reflective layer 12 with respect to the one surface 120 of the first reflective layer 12 is set as a depth position X. A region from the one surface 120 of the first reflective layer 12 to the depth position X is set as a first region R1. The total helical pitch number of the first reflective layer 12 refers to the sum of the helical pitch numbers of the cholesteric liquid crystal layers in the first reflective layer 12. For example, in the optical element 10 shown in FIG. 2, the total helical pitch number of the first reflective layer 12 refers to the sum of the helical pitch number of the first cholesteric liquid crystal layer 20, the helical pitch number of the second cholesteric liquid crystal layer 22, and the helical pitch number of the third cholesteric liquid crystal layer in the first reflective layer 12. For example, in a case where the total helical pitch number of the first reflective layer 12 is 19, the depth position X refers to a depth position corresponding to a position where the helical pitch number is 1.9 from one surface to another surface side of the first reflective layer.

Next, a depth position corresponding to 90% of the total helical pitch number of the first reflective layer 12 from the one surface 120 to the other surface 122 side of the first reflective layer 12 is set as a depth position Y That is, a depth position corresponding to 90% of the total helical pitch number of the first reflective layer 12 with respect to the one surface 120 of the first reflective layer 12 is set as a depth position Y A region from the depth position X to the depth position Y is set as a second region R2. For example, in a case where the total helical pitch number of the first reflective layer 12 is 19, the depth position Y refers to a depth position corresponding to a position where the helical pitch number is 17.1 from one surface to another surface side of the first reflective layer.

Further, a region from the depth position Y to the other surface 122 is set as a third region R3.

In the first reflective layer 12, the birefringences of the first region R1 and the third region R3 are less than the birefringence of the second region R2. Accordingly, the first reflective layer 12 satisfies the requirement X.

In the above description, only the first reflective layer 12 has been described. Even in the second reflective layer 14, the requirement X is also satisfied.

The reflective layers in the optical element satisfy the requirement X such that the occurrence of sidelobe is suppressed.

The birefringences of the first region and the third region are not particularly limited. From the viewpoint of further suppressing the occurrence of sidelobe, in a case where the birefringence of the second region is represented by Reference (1), the birefringences are preferably 0.01 to 0.80, more preferably 0.01 to 0.70, and still more preferably 0.05 to 0.50.

Examples of a method of measuring the birefringence ($\Delta n$) of each of the regions include a method of cutting a cross section from the reflective layer and analyzing the cross-section by ellipsometry to obtain the birefringence ($\Delta n$). By observation using a microscope with a rotating analyzer method or a rotating retarder method that is a general ellipsometry method, a region that appears periodically due to the cholesteric liquid crystal and where the liquid crystal compound is parallel to a cross section of a cut piece is measured, and the measured value is analyzed. As a result, Δn×d and an optical axis can be obtained. Further, by separately measuring a thickness d of the cut piece, the birefringence (Δn) can be calculated.

In a case where the total thickness of each of the regions is equally divided into 10 regions, the above-described measurement is performed at a center thickness position of each of the 10 equally divided regions, and an arithmetic mean value of the birefringences in the 10 equally divided regions is obtained to obtain the birefringence (Δn) of each of the regions.

Examples of a method of forming the reflective layer that satisfies the requirement X include a method of adjusting a birefringence of the cholesteric liquid crystal layer to gradually decrease toward at least one surface side of the reflective layer from the cholesteric liquid crystal layer positioned at a center position of a film thickness in the reflective layer as in the optical element 10 shown in FIG. 2. For example, by adjusting the thicknesses of the first cholesteric liquid crystal layer 20, the second cholesteric liquid crystal layer 22, and the third cholesteric liquid crystal layer 24 shown in FIG. 2 where the lengths of the helical pitches are the same to be 10%, 80%, and 10%, respectively, with respect to the total thickness of the reflective layer, the reflective layer that satisfies the requirement X can be formed.

(Example of Another Liquid Crystal Alignment Pattern)

In the optical element 10 shown in FIG. 2, the optical axis of the liquid crystal compound in the liquid crystal alignment pattern of the cholesteric liquid crystal layer continuously rotates only in the X direction.

However, the present invention is not limited thereto, and various configurations can be used as long as the optical axis of the liquid crystal compound in the cholesteric liquid crystal layer continuously rotates in the one in-plane direction.

Figure 7:
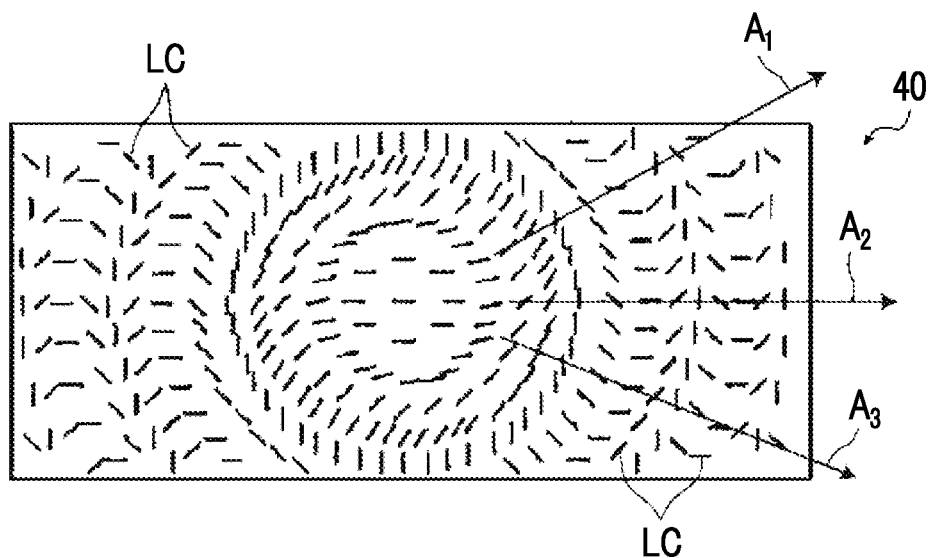
FIG. 7 is a plan view showing another example of the cholesteric liquid crystal layer.

For example, a cholesteric liquid crystal layer 40 conceptually shown in a plan view of FIG. 7 can be used, in which a liquid crystal alignment pattern is a radial pattern having a radial shape where the one in-plane direction in which the direction of the optical axis of the liquid crystal compound LC changes while continuously rotating moves from an inner side toward an outer side.

In the cholesteric liquid crystal layer 40 shown in FIG. 7, the optical axis (not shown) of the liquid crystal compound LC is a longitudinal direction of the liquid crystal compound LC.

In the cholesteric liquid crystal layer 40, the direction of the optical axis of the liquid crystal compound LC changes while continuously rotating in a direction in which a large number of optical axes move to the outer side from the center of the cholesteric liquid crystal layer 40, for example, a direction indicated by an arrow $A_1$, a direction indicated by an arrow $A_2$, a direction indicated by an arrow $A_3$, or . . . .

In addition, as a preferable aspect, for example, the direction of the optical axis of the liquid crystal compound changes while rotating in the same direction in a radial shape from the center of the cholesteric liquid crystal layer 40 as shown in FIG. 7. In the aspect shown in FIG. 7, counterclockwise alignment is shown. Rotation directions of the optical axes indicated by the respective arrows $A_1$, $A_2$, and $A_3$ in FIG. 7 are counterclockwise toward the outer side from the center.

This way, in the cholesteric liquid crystal layer 40 having the liquid crystal alignment pattern in which the optical axis changes while continuously rotating in a radial shape, incidence light can be reflected as diverging light or converging light depending on a rotation direction of the optical axis of the liquid crystal compound LC and the direction of circularly polarized light to be reflected.

That is, by setting the liquid crystal alignment pattern of the cholesteric liquid crystal layer in a radial shape, the optical element according to the embodiment of the present invention exhibits, for example, a function as a concave mirror or a convex mirror.

In the above-described aspect, the aspect where the single period Λ is constant in the one in-plane direction in which the optical axis continuously rotates has been described. However, the present invention is not limited to this aspect. Depending on the use of the optical element, the cholesteric liquid crystal layer may have a region where the single period Λ partially varies in the one in-plane direction in which the optical axis continuously rotates. That is, at least one of the cholesteric liquid crystal layers may have a region where a length of the single period in the liquid crystal alignment pattern varies in a plane.

In addition, in the optical element according to the embodiment of the present invention, depending on the use of the optical element, the single period Λ may gradually change in the one in-plane direction in which the optical axis continuously rotates. That is, the cholesteric liquid crystal layer may have a region where the length of the single period in the liquid crystal alignment pattern gradually changes in the one in-plane direction.

(Alignment Example of Liquid Crystal Compound LC)

The example shown in FIG. 3 shows the configuration in which, on the X-Z plane of the cholesteric liquid crystal layer, the optical axis of the liquid crystal compound LC is aligned to be parallel to the main surface (X-Y plane). However, the present invention is not limited to this aspect. For example, as shown in FIG. 8, a configuration in which, on the X-Z plane of the cholesteric liquid crystal layer 42, a configuration in which the optical axis of the liquid crystal compound LC is aligned to be tilted with respect to the main surface (X-Y plane) may be adopted.

Figure 8:
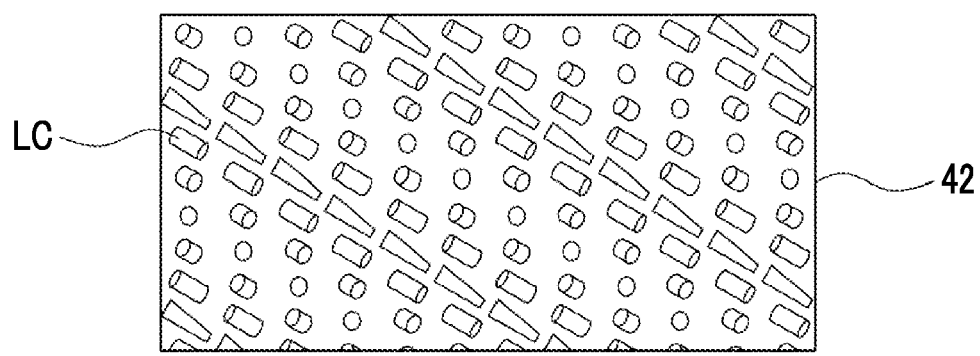
FIG. 8 is a cross-sectional view showing another embodiment of the cholesteric liquid crystal layer.

In addition, the example shown in FIG. 8 shows the configuration in which, on the X-Z plane of the cholesteric liquid crystal layer 42, the tilt angle of the liquid crystal compound LC with respect to the main surface (X-Y plane) is uniform in the thickness direction (Z direction). However, the present invention is not limited to this aspect. In the cholesteric liquid crystal layer, a region where the tilt angle of the liquid crystal compound LC varies in the thickness direction may be provided.

Figure 9:
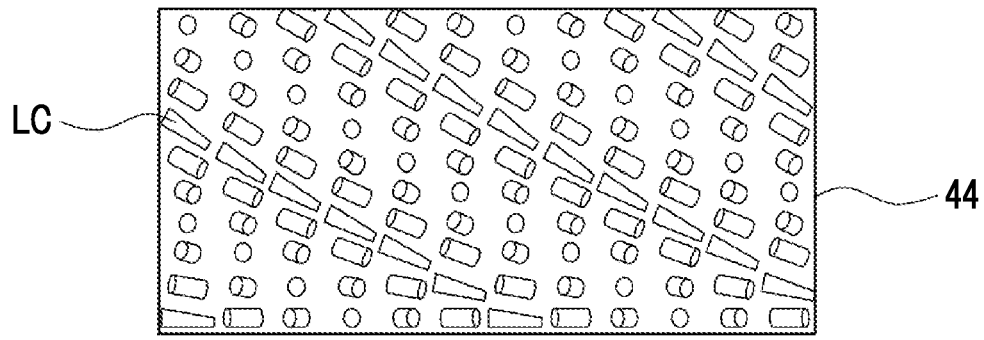
FIG. 9 is a cross-sectional view showing another embodiment of the cholesteric liquid crystal layer.

For example, in an example shown in FIG. 9, the optical axis LC of the liquid crystal compound LC on one surface of a cholesteric liquid crystal layer 44 is parallel to the main surface (the pretilt angle is 0°), the tilt angle of the liquid crystal compound LC increases in a direction away from the one surface to the thickness direction, and the liquid crystal compound is aligned at a given tilt angle until another surface side.

This way, the cholesteric liquid crystal layer may have a configuration in which the optical axis of the liquid crystal compound LC has a pretilt angle at one interface among the upper and lower interfaces or may have a pretilt angle at both of the interfaces. In addition, the pretilt angles at both of the interfaces may be different from each other.

In a case where the X-Z plane of the cholesteric liquid crystal layer having the liquid crystal alignment pattern in which the direction of the optical axis derived from the liquid crystal compound changes while continuously rotating as shown in FIG. 3 is observed with a scanning electron microscope (SEM), a stripe pattern where an arrangement direction in which bright portions and dark portions are alternately arranged is tilted at a predetermined angle with respect to the main surface (X-Y plane) is observed. That is, in a cross section of the cholesteric liquid crystal layer in the optical element according to the embodiment of the present invention observed with a SEM, the bright portions and the dark portions derived from a cholesteric liquid crystalline phase are tilted with respect to the main surface.

In particular, in the cholesteric liquid crystal layer, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the cholesteric liquid crystal layer is tilted with respect to the main surface and the tilt direction substantially matches with the bright portions and the dark portions of the cholesteric liquid crystal layer. The normal direction is a direction orthogonal to the main surface.

By the liquid crystal layer having the above-described configuration, circularly polarized light can be diffracted with a higher diffraction efficiency than the cholesteric liquid crystal layer in which the liquid crystal compound LC is parallel to the main surface.

In the configuration in which the liquid crystal compound of the cholesteric liquid crystal layer is tilted with respect to the main surface and the tilt direction substantially matches the bright portions and the dark portions, bright portions and dark portions corresponding to a reflecting surface match the optical axis of the liquid crystal compound. Therefore, the action of the liquid crystal compound on light reflection (diffraction) increases, the diffraction efficiency can be improved. As a result, the amount of reflected light with respect to incidence light can be further improved.

in addition, the cholesteric liquid crystal layer in the optical element according to the embodiment of the present invention may have a region in which an average tilt angle of the dark portion gradually changes in the one in-plane direction. The cholesteric liquid crystal layer having the above-described region can be obtained by causing the length of the single period in the liquid crystal alignment pattern to gradually change in the one in-plane direction.

In the above-described region, the average tilt angle of the dark portion may gradually increase or may gradually decrease.

The average tilt angle of the dark portion gradually changing represents both of a case where the average tilt angle continuously changes and a case where the average tilt angle changes stepwise.

In addition, in the optical element according to the embodiment of the present invention, depending on the use of the optical element, a region may be provided where an average tilt angle of the dark portion increases in the one in-plane direction as a length of the single period in the liquid crystal alignment pattern decreases.
(Configuration where Plurality of Reflecting Layer Pairs are Provided)

The optical element 10 shown in FIG. 2 includes one reflecting layer pair that is a combination of two reflective layers (the first reflective layer and the second reflective layer) where turning directions of circularly polarized light to be reflected are opposite to each other and at least a part of selective reflection wavelength ranges is an overlapping part.

The present invention is not limited to the above-described aspect, and a plurality of the reflecting layer pairs may be included. In a case where the plurality of reflecting layer pairs are included, it is preferable that selective reflection center wavelengths of the reflective layers forming the reflecting layer pair vary between the different reflecting layer pairs.

In addition, it is preferable that a permutation of lengths of selective reflection center wavelengths and a permutation of lengths of the single periods in the cholesteric liquid crystal layers of the reflective layers forming the reflecting layer pair match each other in the different reflecting layer pairs.

In the optical element 10 shown in FIG. 2, the aspect where each of the reflective layers includes three cholesteric liquid crystal layers has been described. The present invention is not limited to this aspect, and each of the reflective layers may include one, two, four or more cholesteric liquid crystal layers as long as it is a reflective layer that satisfies the above-described requirement X.

<Method of Forming Cholesteric Liquid Crystal Layer and Reflective Layer>

The reflective layer is a layer including a cholesteric liquid crystal layer.

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is maintained. Typically, it is preferable that the structure in which a cholesteric liquid crystalline phase is immobilized is a structure which is obtained by making the polymerizable liquid crystal compound to be in a state where a cholesteric liquid crystalline phase is aligned, polymerizing and curing the polymerizable liquid crystal compound with ultraviolet irradiation or heating to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

——Polymerizable Liquid Crystal Compound——

The polymerizable liquid crystal compound may be a rod-like liquid crystal compound or a disk-like liquid crystal compound.

Examples of the rod-like polymerizable liquid crystal compound for forming the cholesteric liquid crystalline phase include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferable.

The polymerizable liquid crystal compound can be obtained by introducing a polymerizable group into the liquid crystal compound. Examples of the polymerizable group include an unsaturated polymerizable group, an epoxy group, and an aziridinyl group.

Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase disclosed in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer disclosed in JP1997-133810A (JP-H9-133810A), and a liquid crystal polymer disclosed in JP1999-293252A (JP-H11-293252A) can be used.

——Disk-Like Liquid Crystal Compound——

As the disk-like liquid crystal compound, for example, compounds described in JP2007-108732A and JP2010-244038A can be preferably used.

In addition, the content of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

——Surfactant——

The liquid crystal composition used for forming the cholesteric liquid crystal layer may include a surfactant. It is preferable that the surfactant is a compound that can function as an alignment control agent contributing to the stable or rapid formation of a cholesteric liquid crystalline phase with planar alignment. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The content of the surfactant in the liquid crystal composition is preferably 0.01 to 10 mass %, more preferably 0.01 to 5 mass %, and still more preferably 0.02 to 1 mass % with respect to the total mass of the liquid crystal compound.

——Chiral Agent (Optically Active Compound)——

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes a chiral carbon atom. However, an axially chiral compound or a planar chiral compound not having a chiral carbon atom can also be used as the chiral agent. Examples of the axially chiral compound or the planar chiral compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photo mask after coating and alignment, which is preferable. As the photoisomerization group, an isomerization portion of a photochromic compound, an azo group, an azoxy group, or a cinnamoyl group is preferable. Specific examples of the compound include compounds described in JP2002-

080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator to be used is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

——Crosslinking Agent——

In order to improve the film hardness after curing and to improve durability, the liquid crystal composition may include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof, and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. The crosslinking agents may be used alone or in combination of two or more kinds.

The content of the crosslinking agent is preferably 3% to 20 mass % and more preferably 5% to 15 mass % with respect to the solid content mass of the liquid crystal composition.

——Other Additives——

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

Examples of the organic solvent include a ketone, an alkyl halide, an amide, a sulfoxide, a heterocyclic compound, a hydrocarbon, an ester, and an ether. The organic solvents may be used alone or in combination of two or more kinds.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film, it is preferable that the cholesteric liquid crystal layer obtained by immobilizing a cholesteric liquid crystalline phase is formed by applying the liquid crystal composition to the alignment film, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the cholesteric liquid crystal layer is not particularly limited, and the thickness with which a required light reflectivity can be obtained may be appropriately set depending on the use of the optical element, the light reflectivity required for the cholesteric liquid crystal layer, the material for forming the cholesteric liquid crystal layer, and the like.

A method of forming the reflective layer in the optical element is not particularly limited, and examples thereof include a method of sequentially forming the cholesteric liquid crystal layers by forming the cholesteric liquid crystal layer using the above-described method and further forming the cholesteric liquid crystal layer on the formed cholesteric liquid crystal layer using the above-described method.

<Other Members>

The optical element according to the embodiment of the present invention may include members other than the reflective layer.

(Support)

The optical element may include a support.

As the support, various sheet-shaped materials (films or plate-shaped materials) can be used as long as they can support the reflective layer and alignment film described below.

A transmittance of the support with respect to corresponding light (for example, light having a wavelength of 550 nm) is preferably 50% or more, more preferably 70% or more, and still more preferably 85% or more.

The thickness of the support is not particularly limited and may be appropriately set depending on the use of the optical element, a material for forming the support, and the like in a range where the alignment film and the cholesteric liquid crystal layer can be supported.

The thickness of the support is preferably in a range of 1 to 1000 µm, more preferably in a range of 3 to 250 µm, and still more preferably in a range of 5 to 150 µm.

The support may have a monolayer structure or a multi-layer structure.

In a case where the support has a monolayer structure, examples thereof include supports formed of glass, triacetyl cellulose (TAC), polyethylene terephthalate (PET), polycarbonates, polyvinyl chloride, acryl, polyolefin, and the like. In a case where the support has a multi-layer structure, examples thereof include a support including: one of the above-described supports having a monolayer structure that is provided as a substrate; and another layer that is provided on a surface of the substrate.

(Alignment Film)

The optical element may include an alignment film.

It is preferable that the cholesteric liquid crystal layer is formed on a surface of the alignment film. This alignment film is an alignment film for forming the above-described liquid crystal alignment pattern.

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the optical element according to the embodiment of the present invention, for example, the alignment film can be suitably used as a so-called photo-alignment film obtained by irradiating a photo-alignment material with polarized light or non-polarized light. That is, in the optical element according to the embodiment of the present invention, a photo-alignment film that is formed by applying a photo-alignment material to the support is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate (cinnamic acid) compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film is not particularly limited. The thickness with which a required alignment function can be obtained may be appropriately set depending on the material for forming the alignment film.

The thickness of the alignment film is preferably 0.01 to 5 µm and more preferably 0.05 to 2 µm.

A method of forming the alignment film is not limited. Any one of various well-known methods corresponding to a material for forming the alignment film can be used. Examples thereof include a method including: applying the alignment film to a surface of the support; drying the applied alignment film; and exposing the alignment film to laser light to form an alignment pattern.

Figure 10:
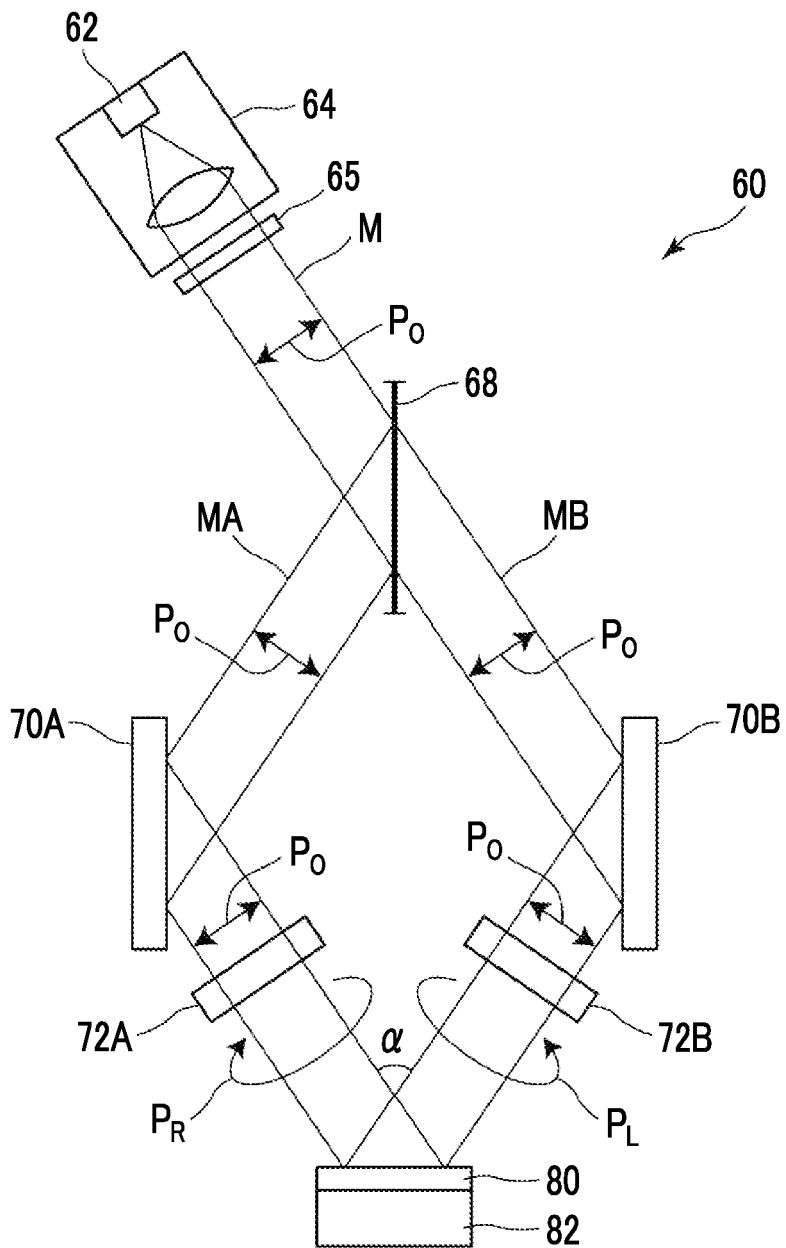
FIG. 10 is a conceptual diagram showing an example of an exposure device that exposes an alignment film.

FIG. 10 conceptually shows an example of an exposure device that exposes the alignment film to form an alignment pattern.

An exposure device 60 shown in FIG. 10 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B. Although not shown in the drawing, the light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The λ/4 plates 72A and 72B used herein are not particularly limited as long as they are λ/4 plates corresponding to wavelengths of light to be emitted. The exposure device 60 emits the laser light M. Therefore, for example, in a case where the central wavelength of the laser light M is 325 nm, a λ/4 plate that functions with respect to light having a wavelength of 325 nm may be used.

A support 82 including an alignment film 80 on which the alignment pattern is not yet formed is disposed at an exposed portion, the two beams MA and MB intersect and interfere with each other on the alignment film 80, and the alignment film 80 is irradiated with and exposed to the interference light.

Due to the interference in this case, the polarization state of light with which the alignment film 80 is irradiated periodically changes according to interference fringes. As a result, in the alignment film 80, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis derived from the liquid crystal compound LC continuously rotates in the one in-plane direction, the length of the single period over which the optical axis rotates by 180° in the one in-plane direction in which the optical axis rotates can be adjusted.

By forming the cholesteric liquid crystal layer on the alignment film having the alignment pattern in which the alignment state periodically changes, the cholesteric liquid crystal layer having the liquid crystal alignment pattern in which the optical axis derived from the above-described liquid crystal compound LC continuously rotates in the one in-plane direction can be formed. In addition, by rotating the optical axes of the λ/4 plates 72A and 72B by 90°, respectively, a rotation direction of the optical axis can be reversed.

(Retardation Plate)

The optical element according to the embodiment of the present invention may include a retardation plate. In particular, a retardation plate may be provided between the two reflective layers forming the reflecting layer pair.

The kind of the retardation plate is not particularly limited. For example, an optimum retardation plate for the use of the optical element is selected, and examples thereof include a C-plate.

(Bonding Layer)

The optical element according to the embodiment of the present invention may include a bonding layer.

As the bonding layer, any layer formed of one of various well-known materials can be used as long as it is a layer that can bond materials as bonding targets. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

The optical element according to the embodiment of the present invention may be formed by supporting each of the layers with a frame, a jig, or the like without using the bonding layer.

<Use>

The optical element according to the embodiment of the present invention can be applied to various uses.

The optical element according to the embodiment of the present invention can be applied to an image display apparatus. More specifically, for example, an image display apparatus including the optical element according to the embodiment of the present invention and an image display panel can be used.

The configuration of the image display apparatus is not particularly limited. For example, an aspect further including a light guide plate can be used.

Figure 11:
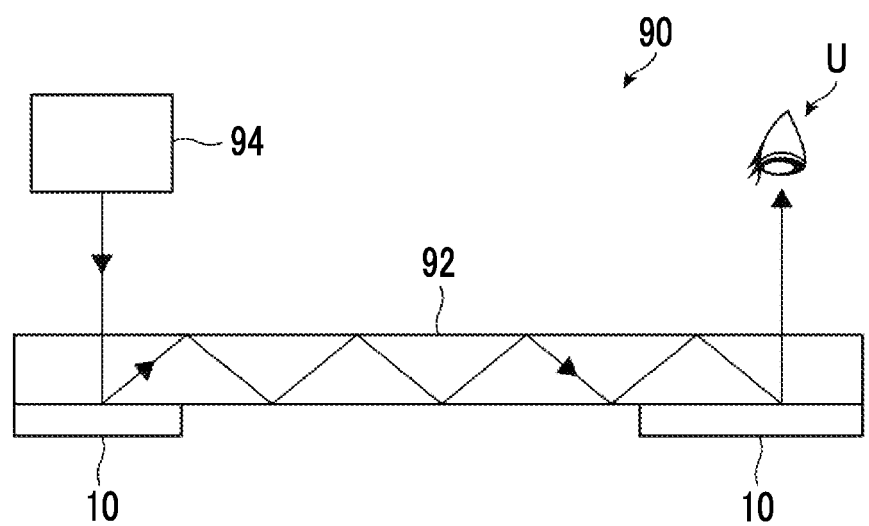
FIG. 11 is a conceptual diagram showing an example of an image display apparatus.

More specifically, an image display apparatus 90 shown in FIG. 11 includes the optical element 10, a light guide plate 92, and an image display panel 94. On the main surface of the light guide plate 92, the optical element 10 is bonded to one end portion, and the optical element 10 is bonded to another end portion. In the above-described configuration, light emitted from the image display panel 94 is reflected from one optical element 10, and the reflected light is totally reflected and guided in the light guide plate 92. The light guided in the light guide plate 92 is reflected from the other optical element 10 at an angle not satisfying total reflection conditions, and is emitted to a user U side. That is, the optical element 10 is used as an incidence diffraction element and an emission diffraction element.

The image display panel 94 is not particularly limited, and various well-known display elements (a display device or a projector) used for AR glasses or the like can be used without any particular limitation.

Examples of the display element include a liquid crystal display (LCOS including Liquid Crystal On Silicon), an organic electroluminescent display, and a scanning type display employing a digital light processing (DLP) or Micro Electro Mechanical Systems (MEMS) mirror.

The display element may display a monochrome image, a two-color image, or a color image.

The projection lens may be a well-known projection lens (condenser lens) used for Augmented Reality (AR) glasses or the like.

The above-described image display apparatus is suitably used as a head-mounted display.

In addition to the above-described uses, the optical element according to the embodiment of the present invention can be applied to, for example, a sensor or an eye tracking apparatus.

EXAMPLES

Hereinafter, the characteristics of the present invention will be described in detail using Examples and Comparative Examples. Materials, used amounts, ratios, treatment details, treatment procedures, and the like shown in the following Examples can be appropriately changed within a range not departing from the scope of the present invention. Accordingly, the scope of the present invention should not be construed as being limited by the specific examples given below.

Raw Materials>

In order to prepare a liquid crystal composition for forming a cholesteric liquid crystal layer, the following raw materials were used.

Material A for Photo-Alignment
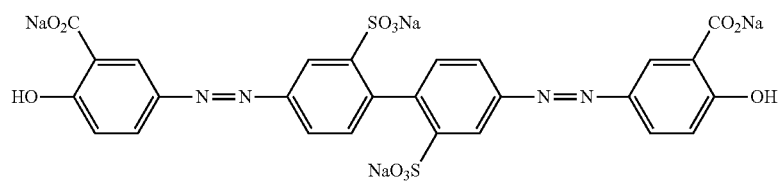
Liquid Crystal Compound L-1
Liquid Crystal Compound L-2
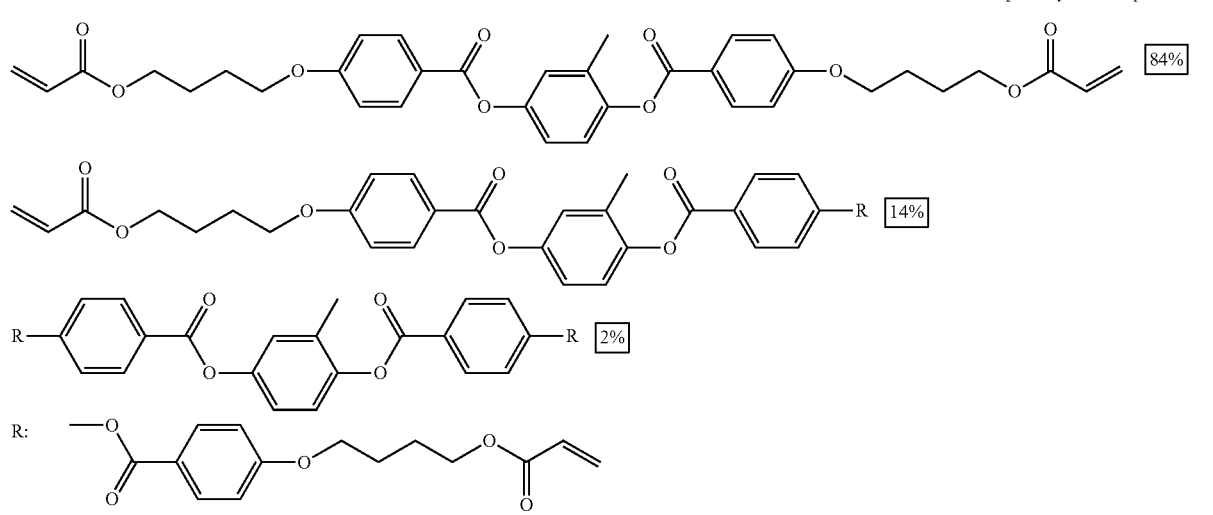
Liquid Crystal Compound L-3
Liquid Crystal Compound L-4
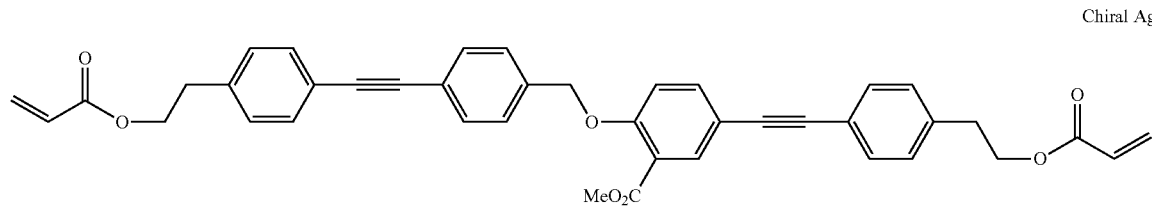
Chiral Agent C-1
Chiral Agent C-2
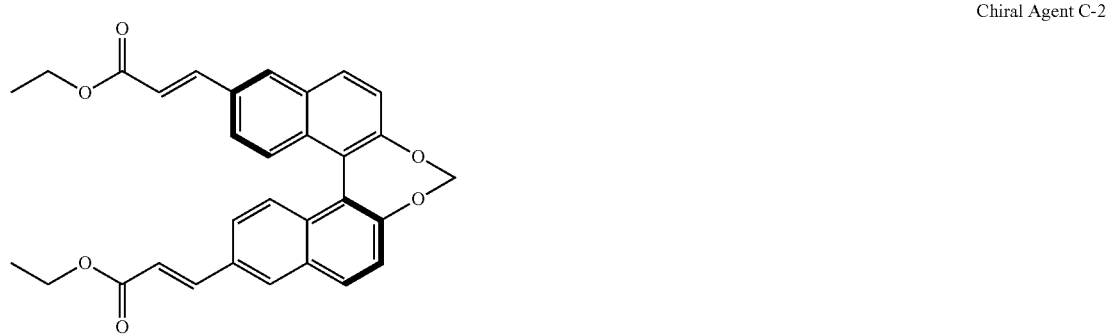

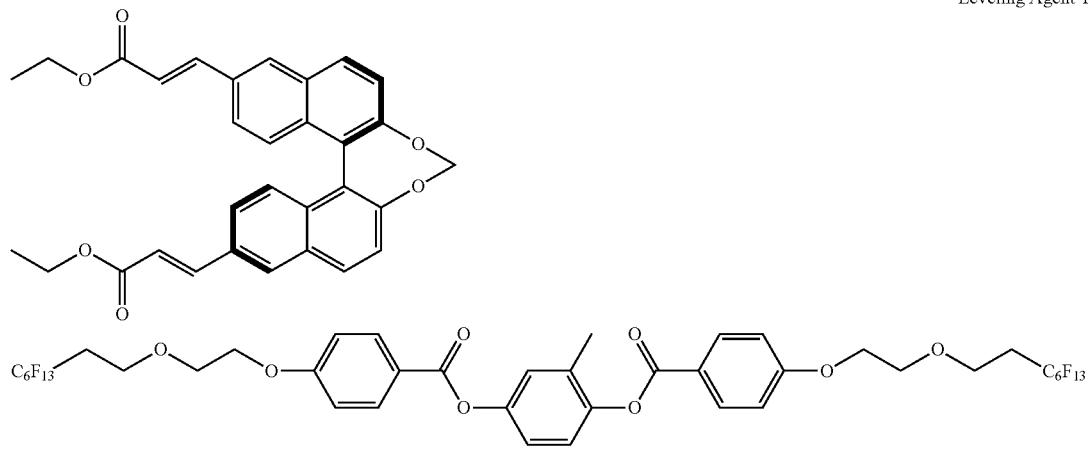

Leveling Agent T-1

Comparative Example 1

A glass substrate was used as the support.

The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

| Coating Liquid for forming Alignment Film | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

(Exposure of Alignment Film)

The alignment film was exposed using the exposure device shown in FIG. 9 to form an alignment film P-1 having an alignment pattern.

In the exposure device, a laser that emits laser light having a wavelength (325 nm) was used as the laser. The exposure amount of the interference light was 1000 mJ/cm$^2$. The single period (the length over which the optical axis rotates by 180°) of an alignment pattern formed by interference of two laser beams was controlled by changing an intersecting angle (intersecting angle α) between the two beams.

As the liquid crystal composition for forming the cholesteric liquid crystal layer, the following composition A-1 was prepared.

| Composition A-1 | |
|---|---|
| Liquid crystal compound L-1 | 100.00 parts by mass |
| Chiral agent C-1 | 3.60 parts by mass |
| Polymerization initiator (IRGACURE OXE01, manufactured by BASF SE) | 1.00 part by mass |
| Leveling agent T-1 | 0.08 parts by mass |
| Cyclopentanone | 900.00 parts by mass |

First, the above-described composition A-1 was applied to the alignment film P-1 to form a coating film, the coating film was heated using a hot plate at 80° C. and was irradiated at 80° C. with ultraviolet light having a wavelength of 365 nm at an irradiation dose of 300 mJ/cm$^2$ using a high pressure mercury lamp in a nitrogen atmosphere. As a result, the alignment of the liquid crystal compound is immobilized, and the cholesteric liquid crystal layer was formed.

Next, the composition A-1 was applied to the cholesteric liquid crystal layer, and the applied composition was heated, cooled, and irradiated with ultraviolet light for curing under the same conditions as described above. This way, by repeating the application multiple times until the total thickness of the formed cholesteric liquid crystal layers reached a desired film thickness, a cholesteric liquid crystal layer was obtained, and a reflective layer was prepared.

In a case where a cross section of a coating layer was observed with a scanning electron microscope (SEM), the helical pitch number in the normal direction (thickness direction) with respect to the main surface was 9. In addition, bright portions and dark portions were tilted with respect to the main surface. The bright portions and the dark portions described herein refer to bright portions and dark portions derived from a cholesteric liquid crystalline phase in a case where a cross section of the cholesteric liquid crystal layer was observed with a SEM.

It was verified using a polarization microscope that the cholesteric liquid crystal layer had a periodically aligned surface as shown in FIG. 4. In a case where a cross section of the cholesteric liquid crystal layer was observed with a SEM, in the liquid crystal alignment pattern of the cholesteric liquid crystal layer, the single period Λ over which the optical axis of the liquid crystal compound rotated by 180° was 0.7 μm.

Using an UV-visible spectrophotometer (UV-3100 manufactured by Shimadzu Corporation), a reflection spectrum of the prepared reflective layer was measured. A selective reflection center wavelength from the obtained reflection spectrum was 530 nm. In addition, Δn(550) of the cholesteric liquid crystal layer was 0.15.

Example 1

Using the same method as that of Comparative Example 1, an alignment film was formed on the glass substrate, and the alignment film was exposed to form an alignment film P-1 having an alignment pattern.

(Formation of First Cholesteric Liquid Crystal Layer)

As the liquid crystal composition for forming the first cholesteric liquid crystal layer, a composition B-1 was prepared using the same method as that of the composition A-1 according to Comparative Example 1, except that the liquid crystal compound L-1 was changed to the liquid crystal compound L-2 and the liquid crystal compound L-3, the mixing ratio was adjusted, and the addition amount of the chiral agent C-1 was adjusted.

Using the same method as that of Comparative Example 1, the composition B-1 was applied to the alignment film P-1 until a desired film thickness was obtained. As a result, a first cholesteric liquid crystal layer was formed.

(Formation of Second Cholesteric Liquid Crystal Layer)

As the liquid crystal composition for forming the second cholesteric liquid crystal layer, a composition B-2 having the same composition as the composition A-1 according to Comparative Example 1 was prepared.

Using the same method as that of Comparative Example 1, the composition B-2 was applied to first cholesteric liquid crystal layer until a desired film thickness was obtained. As a result, a second cholesteric liquid crystal layer was formed.

(Formation of Third Cholesteric Liquid Crystal Layer)

Using the same method as that of Comparative Example 1, the composition B-1 was applied to the second cholesteric liquid crystal layer until a desired film thickness was obtained. As a result, a third cholesteric liquid crystal layer was formed.

(Formation of Alignment Film)

Using the same method as that of Comparative Example 1, an alignment film was formed on the glass substrate, and the alignment film was exposed to form an alignment film P-2 having an alignment pattern. In this case, the alignment film was exposed such that rotation directions of the optical axes derived from the liquid crystal compounds of the liquid crystal alignment patterns were opposite to each other.

(Formation of Fourth Cholesteric Liquid Crystal Layer)

A composition B-3 was prepared using the same method as that of the composition B-1, except that the chiral agent C-1 was changed to the chiral agent C-2 and the addition amount was adjusted.

Using the same method as that of Comparative Example 1, the composition B-3 was applied to the alignment film P-2 until a desired film thickness was obtained. As a result, a fourth cholesteric liquid crystal layer was formed.

(Formation of Fifth Cholesteric Liquid Crystal Layer)

A composition B-4 was prepared using the same method as that of the composition B-2, except that the chiral agent C-1 was changed to the chiral agent C-2 and the addition amount was adjusted.

Using the same method as that of Comparative Example 1, the composition B-4 was applied to the fourth cholesteric liquid crystal layer until a desired film thickness was obtained. As a result, a fifth cholesteric liquid crystal layer was formed.

(Formation of Sixth Cholesteric Liquid Crystal Layer)

Using the same method as that of Comparative Example 1, the composition B-3 was applied to the fifth cholesteric liquid crystal layer until a desired film thickness was obtained. As a result, a sixth cholesteric liquid crystal layer was formed.

A laminate including the fourth cholesteric liquid crystal layer to the sixth cholesteric liquid crystal layer was transferred to a temporary support once, and the fourth cholesteric liquid crystal layer side was bonded to be disposed on the third cholesteric liquid crystal layer through a pressure sensitive adhesive to form an optical element including two reflective layers.

In a case where the cross sections of the first cholesteric liquid crystal layer to the sixth cholesteric liquid crystal layer were observed with a SEM, regarding the pitch number in the normal direction (thickness direction) with respect to the main surface, the pitch number of the first cholesteric liquid crystal layer was 5, the pitch number of the second cholesteric liquid crystal layer was 9, the pitch number of the third cholesteric liquid crystal layer was 5, the pitch number of the fourth cholesteric liquid crystal layer was 5, the pitch number of the fifth cholesteric liquid crystal layer was 9, and the pitch number of the sixth cholesteric liquid crystal layer was 5.

In addition, bright portions and dark portions were tilted with respect to the main surface in each of the layers. In the liquid crystal alignment pattern of each of the cholesteric liquid crystal layers (the first cholesteric liquid crystal layer to the sixth cholesteric liquid crystal layer), the single period Λ over which the optical axis of the liquid crystal compound rotated by 180° was 0.7 μm.

The selective reflection center wavelength of the prepared optical element was 530 nm.

In addition, regarding the birefringence $\Delta n(550)$ of the cholesteric liquid crystal layer, the birefringence $\Delta n(550)$ of the first cholesteric liquid crystal layer was 0.08, the birefringence $\Delta n(550)$ of the second cholesteric liquid crystal layer was 0.15, the birefringence $\Delta n(550)$ of the third cholesteric liquid crystal layer was 0.08, the birefringence $\Delta n(550)$ of the fourth cholesteric liquid crystal layer was 0.08, the birefringence $\Delta n(550)$ of the fifth cholesteric liquid crystal layer was 0.15, and the birefringence $\Delta n(550)$ of the sixth cholesteric liquid crystal layer was 0.08.

Examples 2 and 3

An optical element was formed using the same method as that of Example 1, except that the addition amounts of the chiral agent C-1 and the chiral agent C-2 were appropriately adjusted and each of the cholesteric liquid crystal layers having a predetermined film thickness was formed such that the helical pitch number thereof was as shown in Table 1 below.

Examples 4 and 5

An optical element was formed using the same method as that of Example 1, except that the mixing ratio between the liquid crystal compound L-2 and the liquid crystal compound L-3 and the addition amounts of the chiral agent C-1 and the chiral agent C-2 were appropriately adjusted and each of the cholesteric liquid crystal layers having a predetermined film thickness was formed such that the helical pitch number thereof was as shown in Table 1 below.

Example 6

Using the same method as that of Comparative Example 1, an alignment film was formed on the glass substrate, and the alignment film was exposed to form an alignment film P-1 having an alignment pattern.

(Formation of First Cholesteric Liquid Crystal Layer)

A predetermined composition was obtained using the same method as that of the composition B-1, except that the liquid crystal compound to be used was changed to the liquid crystal compound L-1 to the liquid crystal compound L-4, the mixing ratio thereof was adjusted, and further the addition amount of the chiral agent C-1 was appropriately adjusted. Next, using the same method as that of Comparative Example 1, the obtained composition was applied to the alignment film P-1 until a desired film thickness was obtained, and the first cholesteric liquid crystal layer having a predetermined film thickness was formed such that the helical pitch number thereof was as shown in Table 3 below.

(Formation of Second Cholesteric Liquid Crystal Layer)

A predetermined composition was obtained using the same method as that of the composition B-1, except that the liquid crystal compound to be used was changed to the liquid crystal compound L-1 to the liquid crystal compound L-4, the mixing ratio thereof was adjusted, and further the addition amount of the chiral agent C-1 was appropriately adjusted. Next, using the same method as that of Comparative Example 1, the obtained composition was applied to the first cholesteric liquid crystal layer until a desired film thickness was obtained, and the second cholesteric liquid crystal layer having a predetermined film thickness was formed such that the helical pitch number thereof was as shown in Table 3 below.

(Formation of Third Cholesteric Liquid Crystal Layer)

The same composition as the composition A-1 according to Comparative Example 1 was obtained. Next, using the same method as that of Comparative Example 1, the obtained composition was applied to the second cholesteric liquid crystal layer until a desired film thickness was obtained, and the third cholesteric liquid crystal layer having a predetermined film thickness was formed such that the helical pitch number thereof was as shown in Table 3 below.

(Formation of Fourth Cholesteric Liquid Crystal Layer)

A predetermined composition was obtained using the same method as that of the composition B-1, except that the liquid crystal compound to be used was changed to the liquid crystal compound L-1 to the liquid crystal compound L-4, the mixing ratio thereof was adjusted, and further the addition amount of the chiral agent C-1 was appropriately adjusted. Next, using the same method as that of Comparative Example 1, the obtained composition was applied to the third cholesteric liquid crystal layer until a desired film thickness was obtained, and the fourth cholesteric liquid crystal layer having a predetermined film thickness was formed such that the helical pitch number thereof was as shown in Table 3 below.

(Formation of Fifth Cholesteric Liquid Crystal Layer)

A predetermined composition was obtained using the same method as that of the composition B-1, except that the liquid crystal compound to be used was changed to the liquid crystal compound L-1 to the liquid crystal compound L-4, the mixing ratio thereof was adjusted, and further the addition amount of the chiral agent C-1 was appropriately adjusted. Next, using the same method as that of Comparative Example 1, the obtained composition was applied to the fourth cholesteric liquid crystal layer until a desired film thickness was obtained, and the fifth cholesteric liquid crystal layer having a predetermined film thickness was formed such that the helical pitch number thereof was as shown in Table 3 below.

(Formation of Alignment Film)

Using the same method as that of Comparative Example 1, an alignment film was formed on the glass substrate, and the alignment film was exposed to form an alignment film P-2 having an alignment pattern. In this case, the alignment film was exposed such that rotation directions of the optical axes derived from the liquid crystal compounds of the liquid crystal alignment patterns were opposite to each other.

(Formation of Sixth Cholesteric Liquid Crystal Layer)

A predetermined composition was obtained using the same method as that of the composition B-3, except that the liquid crystal compound to be used was changed to the liquid crystal compound L-1 to the liquid crystal compound L-4, the mixing ratio thereof was adjusted, and the addition amount of the chiral agent C-2 was appropriately adjusted. Next, using the same method as that of Comparative Example 1, the obtained composition was applied to the alignment film P-2 until a desired film thickness was obtained, and the sixth cholesteric liquid crystal layer having a predetermined film thickness was formed such that the helical pitch number thereof was as shown in Table 3 below.

(Formation of Seventh Cholesteric Liquid Crystal Layer)

A predetermined composition was obtained using the same method as that of the composition B-3, except that the liquid crystal compound to be used was changed to the liquid crystal compound L-1 to the liquid crystal compound L-4, the mixing ratio thereof was adjusted, and the addition amount of the chiral agent C-2 was appropriately adjusted. Next, using the same method as that of Comparative Example 1, the obtained composition was applied to the sixth cholesteric liquid crystal layer until a desired film thickness was obtained, and a seventh cholesteric liquid crystal layer having a predetermined film thickness was formed such that the helical pitch number thereof was as shown in Table 3 below.

(Formation of Eighth Cholesteric Liquid Crystal Layer)

A predetermined composition was obtained using the same method as that of the composition A-1 according to Comparative Example 1, except that the chiral agent C-1 was changed to the chiral agent C-2 and the addition amount was adjusted. Next, using the same method as that of Comparative Example 1, the obtained composition was applied to the seventh cholesteric liquid crystal layer until a desired film thickness was obtained, and an eighth cholesteric liquid crystal layer having a predetermined film thickness was formed such that the helical pitch number thereof was as shown in Table 3 below.

(Formation of Ninth Cholesteric Liquid Crystal Layer)

A predetermined composition was obtained using the same method as that of the composition B-3, except that the liquid crystal compound to be used was changed to the liquid crystal compound L-1 to the liquid crystal compound L-4, the mixing ratio thereof was adjusted, and the addition amount of the chiral agent C-2 was appropriately adjusted. Next, using the same method as that of Comparative Example 1, the obtained composition was applied to the eighth cholesteric liquid crystal layer until a desired film thickness was obtained, and a ninth cholesteric liquid crystal layer having a predetermined film thickness was formed such that the helical pitch number thereof was as shown in Table 3 below.

(Formation of Tenth Cholesteric Liquid Crystal Layer)

A predetermined composition was obtained using the same method as that of the composition B-3, except that the liquid crystal compound to be used was changed to the liquid crystal compound L-1 to the liquid crystal compound L-4, the mixing ratio thereof was adjusted, and the addition amount of the chiral agent C-2 was appropriately adjusted. Next, using the same method as that of Comparative Example 1, the obtained composition was applied to the ninth cholesteric liquid crystal layer until a desired film thickness was obtained, and a tenth cholesteric liquid crystal layer having a predetermined film thickness was formed such that the helical pitch number thereof was as shown in Table 3 below.

A laminate including the sixth cholesteric liquid crystal layer to the tenth cholesteric liquid crystal layer was transferred to a temporary support once, and the sixth cholesteric liquid crystal layer side was bonded to be disposed on the fifth cholesteric liquid crystal layer through a pressure sensitive adhesive to form an optical element including two reflective layers.

Both of a selective reflection center wavelength of the laminate (hereinafter, also referred to as "first reflective layer") including the first cholesteric liquid crystal layer to the fifth cholesteric liquid crystal layer and a selective reflection center wavelength of the laminate (hereinafter, also referred to as "second reflective layer") including the sixth cholesteric liquid crystal layer to the tenth cholesteric liquid crystal layer were 530 nm.

In addition, a combination of the first reflective layer and the second reflective layer corresponds to the reflecting layer pair that is a combination of two reflective layers where turning directions of circularly polarized light to be reflected are opposite to each other and at least a part of reflection wavelength ranges is an overlapping part.

Comparative Example 2

An alignment film P-3 was prepared using the same method as that of the exposure of the alignment film in Comparative Example 1, except that the intersecting angle (intersecting angle α) between two beams was changed.

An optical element was prepared using the same method as that of Comparative Example 1, except that the addition amount of the chiral agent C-1 was adjusted and the film thickness of the cholesteric liquid crystal layer was changed.

Example 7

An alignment film P-3 was prepared instead of the alignment film P-1 and an alignment film P-4 was prepared instead of the alignment film P-2 using the same method as that of the exposure of the alignment film in Example 1, except that the intersecting angle (intersecting angle α) between two beams was changed.

An optical element was prepared using the same method as that of Example 1, except that the alignment film P-3 was used instead of the alignment film P-1, the alignment film P-4 was used instead of the alignment film P-2, the addition amounts of the chiral agent C-1 and the chiral agent C-2 were appropriately adjusted, and each of the cholesteric liquid crystal layers having a predetermined film thickness was formed such that the helical pitch number thereof was as shown in Table 2 below.

Examples 8 and 9

An optical element was formed using the same method as that of Example 7, except that the addition amounts of the chiral agent C-1 and the chiral agent C-2 were appropriately adjusted and each of the cholesteric liquid crystal layers having a predetermined film thickness was formed such that the helical pitch number thereof was as shown in Table 2 below.

Examples 10 and 11

An optical element was formed using the same method as that of Example 7, except that the contents of the liquid crystal compound L-1 to the liquid crystal compound L-3 and the addition amounts of the chiral agent C-1 and the chiral agent C-2 were appropriately adjusted and each of the cholesteric liquid crystal layers having a predetermined film thickness was formed such that the helical pitch number thereof was as shown in Table 2 below.

Example 12

An alignment film P-3 was prepared instead of the alignment film P-1 and an alignment film P-4 was prepared instead of the alignment film P-2 using the same method as that of the exposure of the alignment film in Example 1, except that the intersecting angle (intersecting angle α) between two beams was changed.

An optical element was prepared using the same method as that of Example 6, except that the alignment film P-3 was used instead of the alignment film P-1, the alignment film P-4 was used instead of the alignment film P-2, the addition amounts of the chiral agent C-1 and the chiral agent C-2 were appropriately adjusted, and each of the cholesteric liquid crystal layers having a predetermined film thickness was formed such that the helical pitch number thereof was as shown in Table 2 below.

<Evaluation of Occurrence of Sidelobe and Reflectivity>

Using an UV-visible spectrophotometer (UV-3100 manufactured by Shimadzu Corporation), a reflectivity of the prepared optical element was measured.

Based on the obtained reflection spectrum data, a wavelength of an end portion E1 on the short wavelength side in the selective reflection range and a wavelength of an end portion E2 on the long wavelength side in the reflection wavelength range (selective reflection range) were determined. The end portion E1 on the short wavelength side in the reflection wavelength range refers to a wavelength having a minimum reflectivity of a concave portion where the reflectivity was initially 5% or less from the reflection wavelength range toward the short wavelength side. The end portion E2 on the long wavelength side in the reflection wavelength range refers to a wavelength having a minimum reflectivity of a concave portion where the reflectivity was initially 5% or less from the reflection wavelength range toward the long wavelength side.

A wavelength of a position P1 at a distance of 100 nm from the wavelength of the end portion E1 was calculated, and an integrated value V1 of reflectivity between the wavelength of the end portion E1 and the wavelength of the position P1 was calculated. In addition, a wavelength of a position P2 at a distance of 100 nm from the wavelength of the end portion E2 was calculated, and an integrated value V2 of reflectivity between the wavelength of the end portion E2 and the wavelength of the position P2 was calculated.

The obtained integrated values V1 and V2 were added up to calculate a reflectivity of sidelobe.

In addition, the reflectivity at the selective central reflection wavelength in the reflection wavelength range was evaluated.

In Examples 1 to 5 and 7 to 11, Both of a selective reflection center wavelength of the laminate (hereinafter, also referred to as "first reflective layer") including the first cholesteric liquid crystal layer to the third cholesteric liquid crystal layer and a selective reflection center wavelength of the laminate (hereinafter, also referred to as "second reflective layer") including the fourth cholesteric liquid crystal layer to the sixth cholesteric liquid crystal layer were 530 nm.

In addition, a combination of the first reflective layer and the second reflective layer corresponds to the reflecting layer pair that is a combination of two reflective layers where turning directions of circularly polarized light to be reflected are opposite to each other and at least a part of reflection wavelength ranges is an overlapping part.

In addition, the directions in which the optical axes of the liquid crystal compounds in the liquid crystal alignment patterns of the two cholesteric liquid crystal layers in the first reflective layer and the second reflective layer continuously change were the same.

In addition, in Example 6, both of a selective reflection center wavelength of the laminate (hereinafter, also referred to as "third reflective layer") including the first cholesteric liquid crystal layer to the fifth cholesteric liquid crystal layer and a selective reflection center wavelength of the laminate (hereinafter, also referred to as "fourth reflective layer") including the sixth cholesteric liquid crystal layer to the tenth cholesteric liquid crystal layer were 530 nm.

In addition, a combination of the third reflective layer and the fourth reflective layer corresponds to the reflecting layer pair that is a combination of two reflective layers where turning directions of circularly polarized light to be reflected are opposite to each other and at least a part of reflection wavelength ranges is an overlapping part.

In addition, the directions in which the optical axes of the liquid crystal compounds in the liquid crystal alignment patterns of the two cholesteric liquid crystal layers in the third reflective layer and the fourth reflective layer continuously change were the same.

Further, in Example 12, both of a selective reflection center wavelength of the laminate (hereinafter, also referred to as "fifth reflective layer") including the first cholesteric liquid crystal layer to the fifth cholesteric liquid crystal layer and a selective reflection center wavelength of the laminate (hereinafter, also referred to as "sixth reflective layer") including the sixth cholesteric liquid crystal layer to the tenth cholesteric liquid crystal layer were 980 nm.

In addition, a combination of the fifth reflective layer and the sixth reflective layer corresponds to the reflecting layer pair that is a combination of two reflective layers where turning directions of circularly polarized light to be reflected are opposite to each other and at least a part of reflection wavelength ranges is an overlapping part.

In addition, the directions in which the optical axes of the liquid crystal compounds in the liquid crystal alignment patterns of the two cholesteric liquid crystal layers in the fifth reflective layer and the sixth reflective layer continuously change were the same.

In Tables 1 to 3, the field "Selective Central Reflection Wavelength (nm)" represents the selective central reflection wavelength (nm) of the optical element.

In Tables 1 to 3, the field "Single Period Λ (m) of Liquid Crystal Alignment Pattern" represents the value of the single period Λ of the liquid crystal alignment pattern of each of the cholesteric liquid crystal layers.

In Tables 1 to 3, "First Layer" ~ to "Tenth Layer" represent the first cholesteric liquid crystal layer to the tenth cholesteric liquid crystal layer, respectively.

In Tables 1 to 3, "Birefringence Δn(550) of First Region", "Birefringence Δn(550) of Second Region", and "Birefringence Δn(550) of Third Region" represent the birefringences Δn(550) (the birefringences at a wavelength of 550 nm) of the first region to the third region defined by the requirement X in the first reflective layer and the second reflective layer.

TABLE 1

| | | Comparative Example 1 | Example 1 | Example 2 | Example 3 | Example 4 | Example 5 |
|---|---|---|---|---|---|---|---|
| Selective Reflection Center Wavelength [nm] | | 530 | 530 | 530 | 530 | 530 | 530 |
| Single Period Λ of Liquid Crystal Alignment Pattern [μm] | | 0.7 | 0.7 | 0.7 | 0.7 | 0.7 | 0.7 |
| Birefringence Δn(550)/First Reflective Layer (Right Circularly Polarized Light Reflective Layer) | First Layer | 0.15 | 0.08 | 0.08 | 0.08 | 0.05 | 0.10 |
| | Second Layer | — | 0.15 | 0.15 | 0.15 | 0.15 | 0.15 |
| | Third Layer | — | 0.08 | 0.08 | 0.08 | 0.05 | 0.10 |
| Birefringence Δn(550)/Second Reflective Layer (Circularly Polarized Light Reflective Layer) | Fourth Layer | — | 0.08 | 0.08 | 0.08 | 0.05 | 0.10 |
| | Fifth Layer | — | 0.15 | 0.15 | 0.15 | 0.15 | 0.15 |
| | Sixth Layer | — | 0.08 | 0.08 | 0.08 | 0.05 | 0.10 |
| Helical Pitch Number/First Reflective Layer (Right Circularly Polarized Light Reflective Layer) | First Layer | 9 | 5 | 2.5 | 7 | 5 | 5 |
| | Second Layer | — | 9 | 9 | 9 | 9 | 9 |
| | Third Layer | — | 5 | 2.5 | 7 | 5 | 5 |
| Helical Pitch Number/Second Reflective Layer (Circularly Polarized Light Reflective Layer) | Fourth Layer | — | 5 | 2.5 | 7 | 5 | 5 |
| | Fifth Layer | — | 9 | 9 | 9 | 9 | 9 |
| | Sixth Layer | — | 5 | 2.5 | 7 | 5 | 5 |
| Birefringence Δn(550) of First Region | | 0.15 | 0.08 | 0.08 | 0.08 | 0.05 | 0.10 |
| Birefringence Δn(550) of Second Region | | 0.15 | 0.12 | 0.14 | 0.11 | 0.11 | 0.13 |
| Birefringence Δn(550) of Third Region | | 0.15 | 0.08 | 0.08 | 0.08 | 0.05 | 0.10 |
| Reflectivity of Reflection Center Wavelength | | <50% | >80% | >80% | >80% | >80% | >80% |

TABLE 2

| | | Comparative Example 2 | Example 7 | Example 8 | Example 9 | Example 10 | Example 11 |
|---|---|---|---|---|---|---|---|
| Selective Reflection Center Wavelength [nm] | | 980 | 980 | 980 | 980 | 980 | 980 |
| Single Period Λ of Liquid Crystal Alignment Pattern [μm] | | 1.3 | 1.3 | 1.3 | 1.3 | 1.3 | 1.3 |
| Birefringence Δn(550)/First Reflective Layer (Right Circularly Polarized Light | First Layer | 0.15 | 0.08 | 0.08 | 0.08 | 0.05 | 0.10 |
| | Second Layer | — | 0.15 | 0.15 | 0.15 | 0.15 | 0.15 |
| | Third Layer | — | 0.08 | 0.08 | 0.08 | 0.05 | 0.10 |

TABLE 2-continued

|  |  | Comparative Example 2 | Example 7 | Example 8 | Example 9 | Example 10 | Example 11 |
|---|---|---|---|---|---|---|---|
| Reflective Layer) | | | | | | | |
| Birefringence Δn(550)/Second | Fourth Layer | — | 0.08 | 0.08 | 0.08 | 0.05 | 0.10 |
| Reflective Layer (Circularly | Fifth Layer | — | 0.15 | 0.15 | 0.15 | 0.15 | 0.15 |
| Polarized Light Reflective Layer) | Sixth Layer | — | 0.08 | 0.08 | 0.08 | 0.05 | 0.10 |
| Helical Pitch Number/First | First Layer | 9 | 5 | 2.5 | 7 | 5 | 5 |
| Reflective Layer (Right | Second Layer | — | 9 | 9 | 9 | 9 | 9 |
| Circularly Polarized Light | Third Layer | — | 5 | 2.5 | 7 | 5 | 5 |
| Reflective Layer) | | | | | | | |
| Helical Pitch Number/Second | Fourth Layer | — | 5 | 2.5 | 7 | 5 | 5 |
| Reflective Layer (Circularly | Fifth Layer | — | 9 | 9 | 9 | 9 | 9 |
| Polarized Light Reflective Layer) | Sixth Layer | — | 5 | 2.5 | 7 | 5 | 5 |
| Birefringence Δn(550) of First Region | | 0.15 | 0.08 | 0.08 | 0.08 | 0.05 | 0.10 |
| Birefringence Δn(550) of Second Region | | 0.15 | 0.12 | 0.14 | 0.11 | 0.11 | 0.13 |
| Birefringence Δn(550) of Third Region | | 0.15 | 0.08 | 0.08 | 0.08 | 0.05 | 0.10 |
| Reflectivity of Reflection Center Wavelength | | <50% | >80% | >80% | >80% | >80% | >80% |

TABLE 3

|  |  | Example 6 | Example 12 |
|---|---|---|---|
| Selective Reflection Center Wavelength [nm] | | 530 | 980 |
| Single Period Λ of Liquid Crystal Alignment Pattern [μm] | | 0.7 | 1.3 |
| Birefringence Δn(550)/ | First Layer | 0.05 | 0.05 |
| First Reflective Layer | Second Layer | 0.10 | 0.10 |
| (Right Circularly Polarized | Third Layer | 0.15 | 0.15 |
| Light Reflective Layer) | Fourth Layer | 0.10 | 0.10 |
|  | Fifth Layer | 0.05 | 0.05 |
| Birefringence Δn(550)/ | Sixth Layer | 0.05 | 0.05 |
| Second Reflective Layer | Seventh Layer | 0.10 | 0.10 |
| (Circularly Polarized | Eighth Layer | 0.15 | 0.15 |
| Light Reflective Layer) | Ninth Layer | 0.10 | 0.10 |
|  | Tenth Layer | 0.05 | 0.05 |
| Helical Pitch Number/ | First Layer | 2.2 | 2.2 |
| First Reflective Layer | Second Layer | 2.8 | 2.8 |
| (Right Circularly Polarized | Third Layer | 9 | 9 |
| Light Reflective Layer) | Fourth Layer | 2.8 | 2.8 |
|  | Fifth Layer | 2.2 | 2.2 |
| Helical Pitch Number/ | Sixth Layer | 2.2 | 2.2 |
| Second Reflective Layer | Seventh Layer | 2.8 | 2.8 |
| (Circularly Polarized Light | Eighth Layer | 9 | 9 |
| Reflective Layer) | Ninth Layer | 2.8 | 2.8 |
|  | Tenth Layer | 2.2 | 2.2 |
| Birefringence Δn(550) of First Region | | 0.05 | 0.05 |
| Birefringence Δn(550) of Second Region | | 0.13 | 0.13 |
| Birefringence Δn(550) of Third Region | | 0.05 | 0.05 |
| Reflectivity of Reflection Center Wavelength | | >80% | >80% |

It was verified that, in Examples 1 to 6, the reflectivity of sidelobe was reduced as compared to Comparative Example 1. In addition, in Example 6, the effect of reducing the reflectivity of sidelobe was higher than those of Examples 1 to 5.

It was verified that, in Examples 7 to 12, the reflectivity of sidelobe was reduced as compared to Comparative Example 2. In addition, in Example 12, the effect of reducing the reflectivity of sidelobe was higher than those of Examples 7 to 11.

As can be seen from the above results, the effects of the present invention are obvious.

EXPLANATION OF REFERENCES

10: optical element
12: first reflective layer
14: second reflective layer
20: first cholesteric liquid crystal layer
22: second cholesteric liquid crystal layer
24: third cholesteric liquid crystal layer
30: fourth cholesteric liquid crystal layer
32: fifth cholesteric liquid crystal layer
34: sixth cholesteric liquid crystal layer
40, 42, 44: cholesteric liquid crystal layer
60: exposure device
62: laser
64: light source
65: λ/2 plate
68: polarization beam splitter
70A, 70B: mirror
72A, 72B: λ/4 plate
80: alignment film
82: support
90: image display apparatus
92: light guide plate
94: image display panel

What is claimed is:

1. An optical element comprising:
    at least one reflecting layer pair that is a combination of two reflective layers where turning directions of circularly polarized light to be reflected are opposite to each other and at least a part of reflection wavelength ranges is an overlapping part, wherein the reflective layer includes a cholesteric liquid crystal layer obtained by immobilizing a cholesteric liquid crystalline phase, the cholesteric liquid crystal layer has a liquid crystal alignment pattern in which a direction of an optical axis derived from a liquid crystal compound changes while continuously rotating in at least one in-plane direction, in a case where a depth position corresponding to 10% of a total helical pitch number of the reflective layer from one surface to another surface side of the reflective layer is set as a depth position X, a depth position corresponding to 90% of the total helical pitch number of the reflective layer from the one surface to the other surface side of the reflective layer is set as a depth position Y, a region from the one surface to the depth position X is set as a first region, a region from the depth position X to the depth position Y is set as a second region, and a region from the depth position Y to the other surface is set as a third region, at least one of birefringences in the first region and the third region is less than a birefringence in the second region, and in a cross section of the cholesteric liquid crystal layer observed with a scanning electron microscope a bright portion and a dark portion derived from a cholesteric liquid crystalline phase are tilted with respect to a main surface of the cholesteric liquid crystal layer, and at least one cholesteric liquid crystal layer is further provided where, in a case where an in-plane retardation is measured from a normal direction of the main surface of the cholesteric liquid crystal layer and a direction tilted with respect to a normal line, a direction in which the in-plane retardation is minimum in any one of a slow axis plane or a fast axis plane is tilted from the normal direction.

2. The optical element according to claim 1,
wherein the reflective layer includes a plurality of the cholesteric liquid crystal layers,
rotation directions of the optical axes derived from the liquid crystal compounds in the liquid crystal alignment patterns of the plurality of cholesteric liquid crystal layers in one reflective layer among the two reflective layers are the same as each other, and
rotation directions of the optical axes derived from the liquid crystal compounds in the liquid crystal alignment patterns of the plurality of cholesteric liquid crystal layers in the other reflective layer among the two reflective layers are the same as each other.

3. The optical element according to claim 1,
wherein a rotation direction of the optical axis derived from the liquid crystal compound in the liquid crystal alignment pattern of the cholesteric liquid crystal layer in one reflective layer among the two reflective layers and a rotation direction of the optical axis derived from the liquid crystal compound in the liquid crystal alignment pattern of the cholesteric liquid crystal layer in the other reflective layer among the two reflective layers are opposite to each other.

4. The optical element according to claim 1,
wherein in a case where, in the liquid crystal alignment pattern of the cholesteric liquid crystal layer, a length over which the direction of the optical axis derived from the liquid crystal compound rotates by 180° in the one in-plane direction in which the direction of the optical axis derived from the liquid crystal compound changes while continuously rotating is set as a single period,
a length of the single period in the liquid crystal alignment pattern of the cholesteric liquid crystal layer in one reflective layer among the two reflective layers and a length of the single period in the liquid crystal alignment pattern of the cholesteric liquid crystal layer in the other reflective layer among the two reflective layers are the same as each other.

5. The optical element according to claim 1,
wherein at least one of the cholesteric liquid crystal layers has a region where a length of the single period in the liquid crystal alignment pattern varies in a plane.

6. The optical element according to claim 1,
wherein at least one of the cholesteric liquid crystal layers has a region where a length of the single period in the liquid crystal alignment pattern gradually changes in the one in-plane direction.

7. The optical element according to claim 1,
wherein the reflective layer includes a plurality of the cholesteric liquid crystal layers formed of compositions including different liquid crystal compounds, and
a birefringence of the cholesteric liquid crystal layer gradually decreases toward at least one surface side of the reflective layer from the cholesteric liquid crystal layer positioned at a center position of a film thickness in the reflective layer.

8. The optical element according to claim 7,
wherein in the reflective layer, a helical pitch number of the cholesteric liquid crystal layer having a lowest birefringence is less than or equal to half of a helical pitch number of the cholesteric liquid crystal layer having a highest birefringence.

9. The optical element according to claim 1,
wherein a region is provided where an average tilt angle of the dark portion gradually changes in the one in-plane direction as a length of the single period in the liquid crystal alignment pattern decreases.

10. The optical element according to claim 1,
wherein a region is provided where an average tilt angle of the dark portion increases as a length of the single period in the liquid crystal alignment pattern decreases.

11. The optical element according to claim 1, further comprising:
a retardation layer.

12. The optical element according to claim 11,
wherein the retardation layer is provided between a first reflective layer and a second reflective layer.

13. The optical element according to claim 1,
wherein a plurality of the reflecting layer pairs are provided, and
selective reflection center wavelengths of the reflective layers forming the reflecting layer pair vary between the different reflecting layer pairs.

14. The optical element according to claim 1,
wherein a plurality of the reflecting layer pairs are provided, and
a permutation of lengths of selective reflection center wavelengths and a permutation of lengths of the single period in the cholesteric liquid crystal layers of the reflective layers forming the reflecting layer pair match each other in the different reflecting layer pairs.

15. An image display apparatus comprising:
the optical element according to claim 1; and
an image display panel.

16. A head-mounted display comprising:
the image display apparatus according to claim 15.

17. A sensing apparatus comprising:
the optical element according to claim 1.
18. An eye tracking apparatus comprising:
the optical element according to claim 1.
19. An image display apparatus comprising:
the optical element according to claim 2; and
an image display panel.

* * * * *